US010647563B2

(12) United States Patent
Showalter

(10) Patent No.: US 10,647,563 B2
(45) Date of Patent: May 12, 2020

(54) APPARATUS, SYSTEMS AND METHODS FOR DISPENSING DRINKS

(71) Applicant: Edward Showalter, Taft, CA (US)

(72) Inventor: Edward Showalter, Taft, CA (US)

( * ) Notice: Subject to any disclaimer, the term of this patent is extended or adjusted under 35 U.S.C. 154(b) by 1535 days.

(21) Appl. No.: 14/586,782

(22) Filed: Dec. 30, 2014

(65) Prior Publication Data

US 2016/0183715 A1 Jun. 30, 2016

(51) Int. Cl.

| | |
|---|---|
| ***A47J 31/44*** | (2006.01) |
| ***A47J 31/40*** | (2006.01) |
| ***F16L 21/00*** | (2006.01) |
| ***B67D 1/00*** | (2006.01) |
| ***B67D 1/08*** | (2006.01) |
| ***B67D 1/06*** | (2006.01) |
| ***B67D 1/04*** | (2006.01) |

(52) U.S. Cl.

CPC ............. *B67D 1/00* (2013.01); *B67D 1/0004* (2013.01); *B67D 1/0406* (2013.01); *B67D 1/0462* (2013.01); *B67D 1/06* (2013.01); *B67D 1/0862* (2013.01); *B67D 2001/0812* (2013.01)

(58) Field of Classification Search

CPC ...... B67D 1/00; B67D 1/0004; B67D 1/0406; B67D 1/0462; B67D 1/06; B67D 1/0862; B67D 2001/0812

USPC ............... 99/285, 287, 295, 302 P; 285/399; 29/428

See application file for complete search history.

(56) References Cited

U.S. PATENT DOCUMENTS

| | | | | | |
|---|---|---|---|---|---|
| 2,670,605 | A * | 3/1954 | Van Zandt | F17C 5/02 | 137/169 |
| 2,894,270 | A * | 7/1959 | Manthos | B63B 35/74 | 441/131 |
| 2,944,616 | A * | 7/1960 | Bernard | A01D 34/69 | 180/19.1 |
| 3,393,843 | A * | 7/1968 | Webster | F16K 1/303 | 222/3 |
| 3,441,952 | A * | 4/1969 | Strader | A63B 35/12 | 440/6 |

(Continued)

FOREIGN PATENT DOCUMENTS

| | | |
|---|---|---|
| CN | 201771434 | 3/2011 |
| JP | 3080422 | 9/2001 |

OTHER PUBLICATIONS

"Notification of Transmittal of the International Search Report and the Written Opinion of the International Searching Authority, or the Declaration," Patent Cooperation Treaty, dated Feb. 1, 2016.

(Continued)

*Primary Examiner* — Eric S Stapleton

(74) *Attorney, Agent, or Firm* — CIONCA IP Law P.C.; Marin Cionca

(57) ABSTRACT

An apparatus for dispensing a first liquid comprising a second liquid, the apparatus comprising: a male coupling configured to enter and establish a friction seal with a female coupling of a container containing the second liquid by inserting the male coupling into the female coupling and applying a load to the male coupling, the load being provided by the weight of a portion of the apparatus; a spout; and a pump for causing the second liquid to exit the container and the first liquid to be dispensed via the spout after the friction seal is established between the female and male couplings.

1 Claim, 22 Drawing Sheets

(56) References Cited

U.S. PATENT DOCUMENTS 3,530,800 A * 9/1970 Watkins .................. B61C 11/00 104/168
3,618,905 A * 11/1971 Primus ................. B67D 1/0036 261/121.1
3,752,362 A * 8/1973 Risener .................... B67D 1/08 222/400.7
3,874,314 A * 4/1975 Sanders .................. B63B 9/065 114/265
3,926,538 A * 12/1975 Welt ........................ F01C 19/04 418/115
3,952,918 A * 4/1976 Poitras ...................... B67B 7/28 222/82
3,964,636 A * 6/1976 Rehrig ................... B65D 77/06 220/495.06
4,101,140 A * 7/1978 Reid ........................ F16J 15/32 277/461
4,116,451 A * 9/1978 Nixon ..................... E21B 4/003 277/336
4,129,306 A * 12/1978 Konno ...................... B01F 7/06 277/507
4,158,329 A * 6/1979 McKnight ............... A47J 31/02 426/433
4,169,605 A * 10/1979 Nishimoto ........... F16J 15/3448 277/353
4,331,434 A * 5/1982 Buschor ................ B65B 61/184 493/135
4,375,864 A * 3/1983 Savage ................ B65D 77/067 222/81
4,384,724 A * 5/1983 Derman ................... F16J 15/40 277/431
4,398,731 A * 8/1983 Gorman ................... F16J 15/22 277/529
4,437,499 A * 3/1984 Devale ................. B67D 1/1236 141/198
4,440,319 A * 4/1984 Nitchman .............. B65D 77/06 220/23.88
4,457,454 A * 7/1984 Meshberg ........... B05B 11/3001 222/95
4,707,150 A * 11/1987 Graham ................... F16J 15/36 384/477
4,722,001 A * 1/1988 Rohrich .................. F16L 55/28 104/13
4,772,134 A * 9/1988 Jensen .................. A61F 5/4404 285/382.4
5,127,318 A * 7/1992 Selby, III .................. A23F 5/26 99/295
5,152,244 A * 10/1992 Jarmillo, Jr. ............ B63B 27/14 114/362
5,184,476 A * 2/1993 Desrosiers ............... B67D 1/06 62/389
5,205,440 A * 4/1993 Matsushita .......... B67D 1/0462 222/496
5,309,821 A * 5/1994 Knepler ................ A47J 31/467 392/450
5,440,972 A * 8/1995 English ................. A47J 31/005 99/282
5,484,538 A * 1/1996 Woodward ............ A47J 31/605 210/767
5,513,768 A * 5/1996 Smith ................. B01L 3/50825 215/278
5,806,550 A * 9/1998 Frank ..................... A23G 9/045 137/7
5,926,953 A * 7/1999 Behar ................. B05B 11/3025 29/888.02
5,957,328 A * 9/1999 Osgar .................... B67D 7/344 222/1
D458,320 S 6/2002 Domingues
6,439,429 B1 * 8/2002 Gross ..................... B65D 41/34 222/153.02
6,549,744 B2 * 4/2003 Terazawa .............. B65D 77/06 222/105
6,609,636 B1 * 8/2003 Petriekis .............. B65D 77/065 222/105
6,669,051 B1 * 12/2003 Phallen ................... B67C 3/281 222/1
6,777,007 B2 * 8/2004 Cai ..................... A47J 31/0647 206/0.5
7,461,585 B2 * 12/2008 Nenov .................... A47J 31/36 210/473
7,506,577 B2 * 3/2009 Maver ................ A47J 31/3623 99/289 R
7,677,158 B2 * 3/2010 McDuffie ............ A47J 31/4407 99/289 R
7,784,396 B2 * 8/2010 Fai ...................... A47J 31/4467 99/287
8,479,643 B2 * 7/2013 Aemisegger ............ A47J 31/46 250/577
8,960,078 B2 * 2/2015 Hristov ............... A47J 31/0673 426/79
9,994,437 B2 * 6/2018 Showalter ......... B01F 15/00837
10,040,042 B2 * 8/2018 Showalter ............ B67D 1/0804
2003/0098320 A1 * 5/2003 Phelps ................. B67D 1/0406 222/400.7
2004/0055473 A1 * 3/2004 Stoner ...................... A47J 31/36 99/295
2004/0196735 A1 * 10/2004 Barker ............... A61B 17/8833 366/139
2005/0061831 A1 * 3/2005 Brown ...................... A45F 3/20 222/107
2006/0144244 A1 * 7/2006 Girard ................... A47J 31/402 99/295
2008/0022652 A1 * 1/2008 Blacklidge ................ F04B 7/04 60/221
2008/0050211 A1 * 2/2008 Showalter ........... B65B 69/0008 414/412
2008/0128456 A1 * 6/2008 Grimwade ........... B67D 1/0412 222/399
2008/0148957 A1 * 6/2008 Zanetti ................ A47J 31/0668 99/295
2008/0233019 A1 * 9/2008 Dean, II ............. B01D 53/0415 422/180
2008/0272557 A1 * 11/2008 Foti ......................... D06F 37/00 277/589
2009/0007792 A1 * 1/2009 Glucksman ......... A47J 31/4407 99/282
2009/0026225 A1 * 1/2009 Lickstein ............. A47K 5/1202 222/325
2009/0301317 A1 * 12/2009 Andrews ................ A23C 3/045 99/453
2010/0048336 A1 * 2/2010 Mack .................... F16H 7/1218 474/138
2010/0101929 A1 * 4/2010 Kamen .................... B01D 1/28 202/185.3
2010/0252583 A1 * 10/2010 Maas ................. B65D 83/0055 222/386.5
2010/0304357 A1 * 12/2010 Meyers .................... A61J 11/04 435/4
2011/0024423 A1 * 2/2011 Erspamer ........... B65D 41/3428 220/266
2011/0121032 A1 * 5/2011 Deo ..................... B67D 1/0027 222/145.1
2011/0133412 A1 * 6/2011 Mause ................ F16C 33/7823 277/352
2011/0167769 A1 * 7/2011 Canegallo ............ B65D 51/226 53/469
2011/0226343 A1 * 9/2011 Novak ...................... A23L 2/54 137/12.5
2012/0217265 A1 * 8/2012 Edwards .............. B65D 77/067 222/105
2012/0298676 A1 * 11/2012 Cooks ...................... B65D 1/04 220/592.21
2012/0305605 A1 * 12/2012 Vassaux ............... B67D 1/0005 134/93
2013/0108754 A1 * 5/2013 Blanc .................. A47J 31/3623 426/431
2013/0199662 A1 * 8/2013 Gebbink ................ B65D 47/00 141/2

(56) References Cited

U.S. PATENT DOCUMENTS

| | | | | |
|---|---|---|---|---|
| 2013/0287597 A1* | 10/2013 | McNichol | F04B 47/08 | 417/53 |
| 2013/0313458 A1* | 11/2013 | Kouketsu | F16K 31/1262 | 251/193 |
| 2014/0144935 A1* | 5/2014 | O'Keefe, Jr. | B67D 3/043 | 222/23 |
| 2014/0170280 A1* | 6/2014 | St. Germain | A47J 31/18 | 426/433 |
| 2014/0175756 A1* | 6/2014 | Ikeda | F16J 15/164 | 277/552 |
| 2014/0227411 A1* | 8/2014 | Popeil | A47J 37/1209 | 426/302 |
| 2015/0021216 A1* | 1/2015 | Blagojevic | B65D 53/00 | 206/223 |
| 2015/0201789 A1* | 7/2015 | Smith | A47J 31/407 | 99/295 |
| 2015/0201790 A1* | 7/2015 | Smith | A23F 3/18 | 426/431 |
| 2015/0201791 A1* | 7/2015 | Tinkler | B65D 85/8043 | 426/431 |
| 2016/0183715 A1* | 6/2016 | Showalter | B67D 1/00 | 99/285 |
| 2016/0185586 A1* | 6/2016 | Showalter | B65D 35/28 | 366/314 |

OTHER PUBLICATIONS

U.S. Appl. No. 14/586,741; filed Dec. 30, 2014; Edward Showalter.
http://registerguard.com/rg/life/tastings/29982007-82/wine-tap-says-kegs-philpot.html.csp#; (See p. 1 of attached NPL No. 1 document).
http://www.kegerators.com/double-tap.php.
http://cabanawine.com/WineBall.html.
http://torrindustries.com/dispensing-options/torr-keg/.
http://torrindustries.com/dispensing-options/the-torr-flexcase/.
http://www.vinotemp.com/View.aspx/6436/Vinotemp-4-Tap-Wine-Keg-Dispenser?kpid=VT-WINEKEG01&gclid=CIDrqfKR78MCFQmDfgodTAIADQ.
http://torrindustries.com/dispensing-options/kegerators/.
http://www.kegerators.com/equipment/winerator.php.
http://www.thefind.com/search?query=wine+dispenser.
http://www.rollergrill-international.com/en/produit/wine-dispenser-3-bags-of-10-I-408.html.
http://www.brookstone.com/boxxle-31-box-wine-dispenser.
http://boxxle.com.
http://boxxle.com/what-is-boxxle/.
http://the-gadgeteer.com/2013/08/14/boxxle-bag-in-box-wine-dispenser-review/.
http://www.amazon.com/Vacu-Vin-3646450-Wine-Tender/dp/B001AG576A.
http://www.lifestylefancy.com/fiduz-bib-wine-dispenser-wine-cell/.
http://www.cnet.com/news/how-to-swank-up-that-box-of-franzia/.
http://vinocopiabarrel.com/wine-barrel.
http://www.sterlingwineonline.com/catalog/item/4317986/boxed-wine-dispenser.htm.
http://www.sterlingwineonline.com/boxed-wine-dispenser.html.
http://www.thegreenhead.com/2012/04/wine-dispensing-oak-barrel.php.
http://www.vintagecellars.com/keeper.
http://www.mrfizz.com/winesaver.html.
http://www.amazon.com/Wine-Dispenser-Preserver-bottle-Oak/dp/B00112OBBU.
http://www.amazon.com/Vinotemp-VT-WINEDISP4-Bottle-Dispenser-Black/dp/B003O7CF5O.
http://www.vintagecellars.com/winekeeper-preservtion.
http://www.wineenthusiast.com/eurocave-vin-au-verre-wine-preserver-dispenser.asp.
http://www.winekeeper.com/commercial-wk/.
http://www.enomatic.com/.
http://epourtech.com/products.html.
http://epourtech.com/bib.html.
http://epourtech.com/accurate.html.
http://epourtech.com/connectors.html.
http://epourtech.com/commercial.html.
http://www.drvino.com/2010/09/14/self-serve-tanks-wine-french-supermarkets/.
http://www.winesandvines.com/template.cfm?section=news&content=77028&htitle=Government%20Limits%20Wine%20Dispensers.
www.blackboxwines.com/about-us/opening-storing.html.
http://www.sodastreamusa.com/.
http://www.botabox.com/Benefits/.
http://www.evcontainer.com/.
http://elimnatural.en.made-in-china.com/product/NbxQgWuyZjRq/China-Plastic-Beer-Keg.html.
www.lairdandcompany.com.
http://www.petainer.com/Products/Kegs/Keg-Specification.
http://www.syneksystem.com/hs_faq/much-beer-cartridge-hold/.
http://www.brevilleusa.com/the-oracle.html.
http://www.keurig.com/Brewers/Home/Keurig%C2%AE-2-0-K550-Brewing-System/p/keurig-2-0-k550-brewing-system.
http://www.usatoday.com/story/money/business/2014/04/14/coca-cola-coke-freestyle-soft-drinks-beverages/7478341/.
http://www.wsj.com/articles/superautomatic-espresso-machines-that-are-truly-super-1408723109.

* cited by examiner

APPARATUS, SYSTEMS AND METHODS FOR DISPENSING DRINKS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to apparatuses, systems and methods for making and dispensing liquids and more particularly to apparatuses, systems and methods for making and dispensing drinks and soft serve foods (e.g., soup, yogurt, etc.).

2. Description of the Related Art

There are several apparatuses, systems and methods for making and dispensing drinks available on the market today. However, they have several limitations. For example, some must use ice to chill beverage as they are not equipped with refrigeration systems to cool the beverages and/or keep them at a set or selected temperature. Others cannot brew hot beverages. Others can't mix beverages. Likewise, other beverage dispensers can't dispense both hot and chilled beverage from same spout. To accommodate all beverages, users might have to purchase four, five, six, seven, eight or more dispensers. That can be very expensive and also very inconvenient, to, for example, store all of those dispensers.

Some require steel kegs that need to be returned for washing and refilling. Large amounts of dollars are spent with water waste, carbon footprint and transportation. Because of high transportation costs, it is typically cost prohibitive for a beer brewery to ship draft beer from one location around the world. Same it is true for wineries using wine steel and/or plastic kegs.

Thus, there is a need for new and improved apparatus, system and method for making and dispensing drinks that solve the problems described above, by giving the user the versatility, convenience and the efficiency user needs, while enabling the user to be environmentally responsible, by providing a one-size-fits-all, all-in-one beverage dispensing system that is eco-friendly. That way, user only needs one apparatus to dispense any beverage.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a V-friction coupling is provided that establishes airtight seal that allows beverage pumps to pump the beverage and that also prevents air contamination or spoilage of beverage in the provided beverage container or keg. The air tight seal also stops beverage spoilage by oxidation or beverage to go flat in taste. Further, it may prolong the life of beverage in some cases, like in the case of wine, beer or soda. Another advantage is that the same beverage pour spout of the provided dispensers may be operated with hot or chilled, carbonated or non-carbonated beverage.

In another exemplary embodiment, beverage flavor pods are provided, which could be coffee, tea, coco, soda, flavored powder for fruit flavored beverage, and so on, so that the user could use for example coffee flavored pod in a spout pour housing to mix with soda for example. Further, the beverage flavor pods may have a bar code that can be scanned by the dispenser to retrieve for example pour instructions. The dispenser may have spikes (e.g., four spikes) to pierce the pod, allowing water/beverage to absorb flavor from the pod, and pour resulting beverage in a user's glass.

In another exemplary embodiment, the beverage pour housing of the dispenser can be used with or without flavored pod. For example, the user could place a wine keg in a bay chamber of the dispenser, set the temperature for that chamber at preferred level and dispense wine. If user decides to remove the wine box from that chamber and install a box of spring water, the user can make and dispense hot beverage or cold beverages.

In another exemplary embodiment, the beverage heater and the pump are part of top lift lid of dispenser, such that the beverage pump draws the beverage from the keg/beverage container and pushes it through the heater. User however can select hot or chilled beverage via dispenser's controls or via smart phone app controls. If chilled beverage is selected, the beverage heater is not turned on. If user selects hot beverage, heater turns on making the beverage hot.

In another exemplary embodiment, a CO2 control valve selector is provided allowing for carbonation to flow into beverage keg, or stopping flow of CO2 gas, allowing for the dispensing of a non-carbonated beverage, such as milk or wine.

In another exemplary embodiment, each chamber of the dispenser is independently controlled, so that each chamber can be set to maintain different temperatures.

In another exemplary embodiment, the beverage container is a disposable, one-way container, made of biodegradable materials. Among other advantages, this provides the advantage of lower shipping cost due to less weight of packaging.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 2:
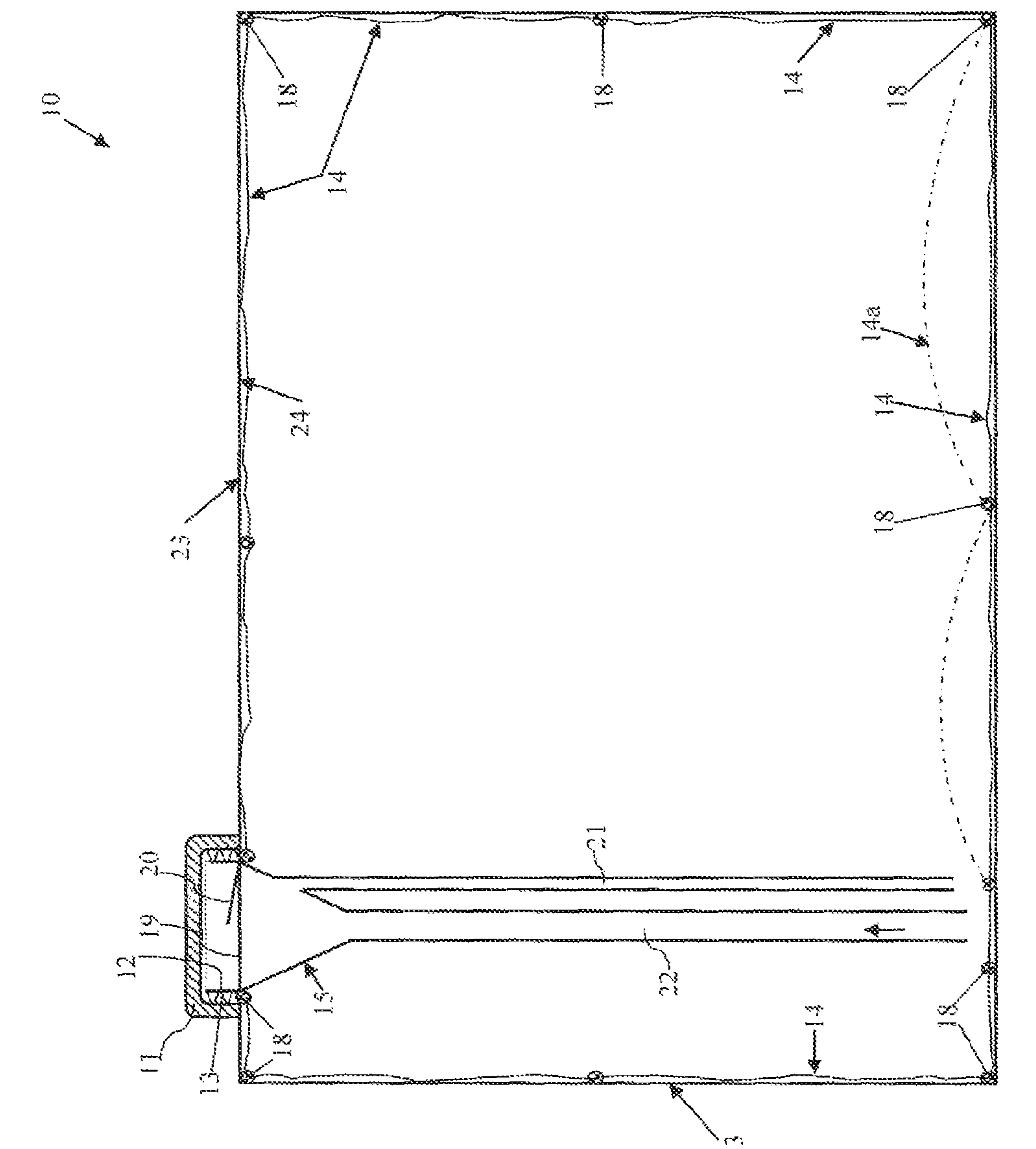
FIG. 2 illustrates a side sectional view of the drink container from FIG. 1, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

Figure 1:
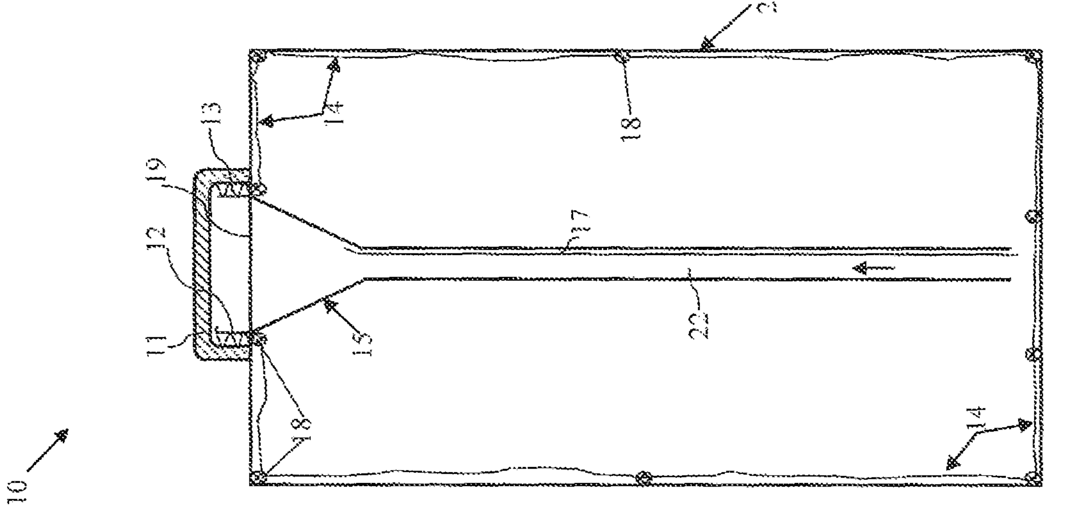
FIG. 1 illustrates a front sectional view of a drink container, according to an embodiment.

FIG. 1 illustrates a front sectional view of a drink container, according to an embodiment. FIG. 2 illustrates a side sectional view of the drink container from FIG. 1, according to an embodiment. It should be understood that while the container 10 will be described herein as a drink container, its uses may be expanded to other liquids (e.g., cooking oil, motor oil), pastes or viscous materials (e.g., liquid soap, ketchup), or soft serve foods (e.g., soups, smoothies, ice cream, yogurt, etc.) to take advantage of its unique features, such as the V-coupling. As shown, the drink container 10 may be a rectangular box or keg having an exterior surface 23 and an interior surface 24. The drink container 10 may also be square. The drink container 10 may be made from biodegradable cardboard or recyclable plastic that is strong enough to maintain the container's shape. The drink container 10 may have a spout 12, which, after filling the container with the drink, is preferably air tight sealed by a foil seal 19 and more preferably also using a pet cock valve 102 (see FIG. 29). The valve 102 holds the seal until user installs container 10 into the dispenser, as shown, and as it will be described in more details later when referring to FIGS. 29-32. The foil seal 19 may be removed by a user by pulling on the seal tab 20. On the outside, the spout 12 may have threads 13 corresponding with the threads of a cap 11, such that to allow a user to fasten the cap 11 onto the spout 12 or to remove it when necessary.

The container 10 further includes a V-shape female coupling 15 made of hard plastic for example, which communicates at its upper end with the spout 12 and at its lower end with a beverage well tube 22. As it will be described in more details later in this disclosure, the V-shape (e.g., funnel shape) female coupling 15 is configured to receive a corresponding V-shape male coupling 15*b* (see FIG. 16 for example) to quickly create a friction air tight seal under the influence of a weight load applied to the V-shape male coupling.

A plastic liner bag 14, preferably biodegradable, is also preferably provided to receive and hold the drink (e.g., wine) stored in container 10. As shown, the plastic liner bag 14 is preferably fasten, using glue for example, to the interior wall 24 of the container 10 at several fastening locations 18, including the corners of the container 10. During the removal (e.g., pumping it out by suction) of the liquid/drink from box 10, the liner bag 14 may have the tendency to move away from the interior wall 24 of container 10, as shown at 14*a*. Thus, without the fastening points 18, the liner bag 14 may clog the well tube 22. The clogging of the well tube 22 is prevented by the fastening points 18, and as such, the drink is able to flow easily through the well tube 22 out of container 10.

As shown, the container 10 may be equipped with a beverage level sensor strip 17, which, as it will be described in more detail later when referring to FIG. 22, may assist a user in knowing the level of beverage remaining in the container 10 during use and/or alert the user to acquire a new/filled container. Furthermore, the container 10 may be also equipped with a container $CO_2$ line 21 for use with carbonated beverages. The operation and functions of these two features of the container 10 will also be described in more details later in this disclosure.

The container 10 may be used as a mini keg ranging in size from, for example, ½ gallons to 2.5 gallons, or 6 or 10 gallons, or it may be used as larger kegs. The container 10 may be for example 4 inch wide, 12 inch long and 8 inch high.

Figures 3, 4, 5:
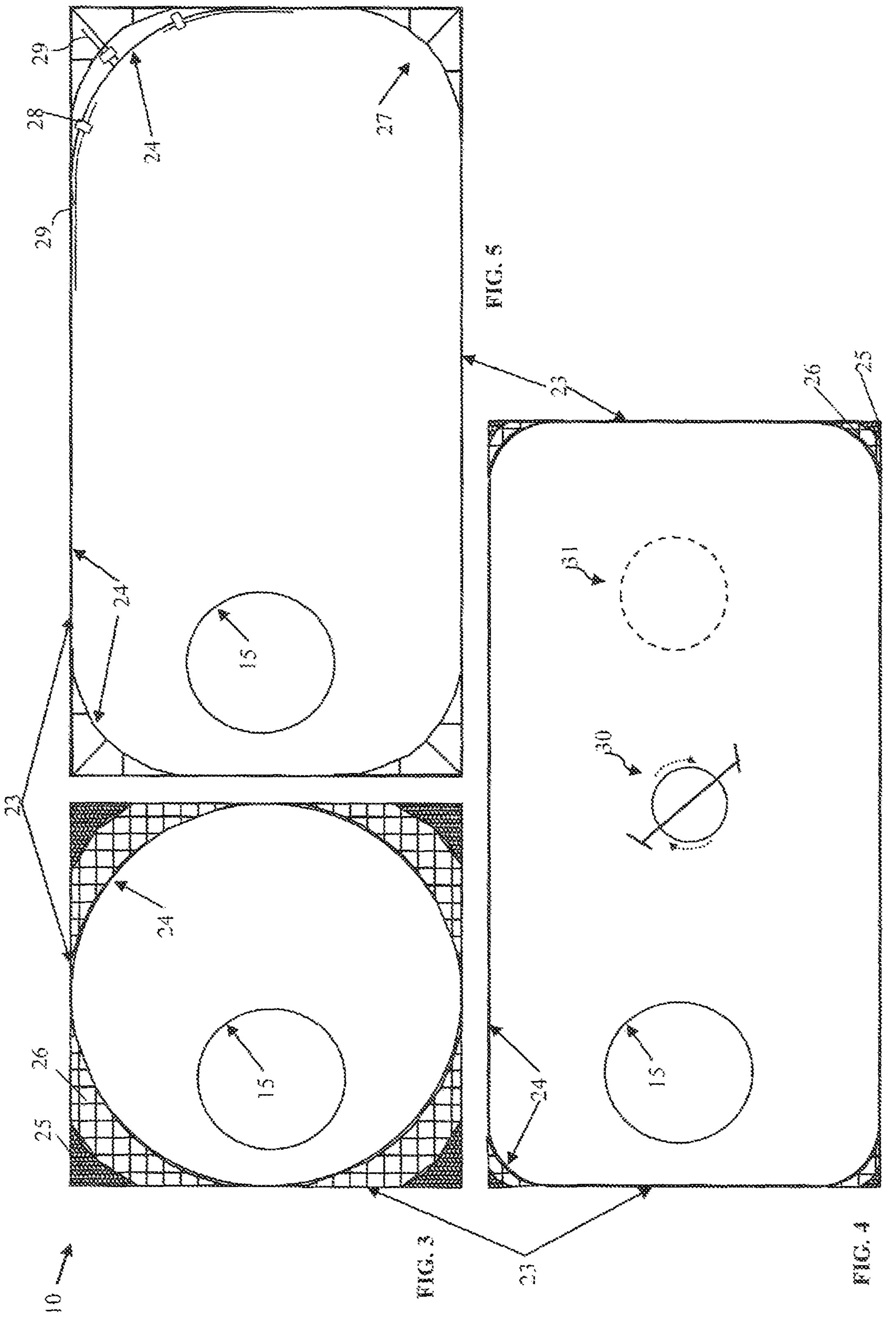
FIGS. 3-5 illustrate top sectional views of the drink container from FIG. 1, depicting certain aspects, according to several embodiments.
Figure 7:
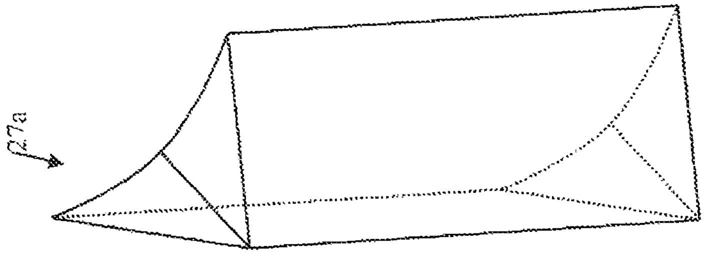
FIG. 7 illustrates a fixed, non-adjustable corner brace for the drink container from FIG. 1, according to an embodiment.
Figure 6:
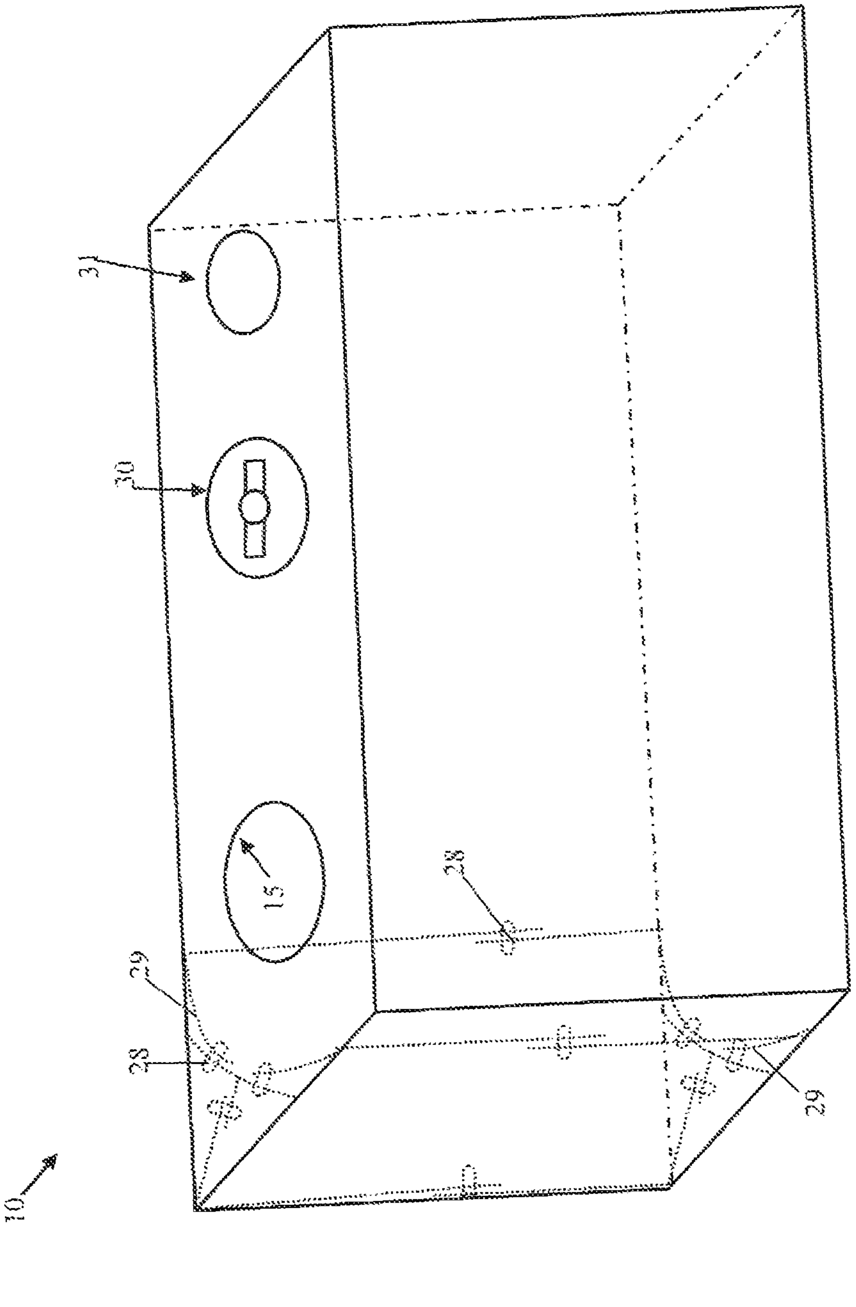
FIG. 6 illustrates a top-side perspective view of the drink container from FIG. 1, depicting certain aspects, according to several embodiments.

FIGS. 3-5 illustrate top sectional views of the drink container from FIG. 1, depicting certain aspects, according to several embodiments. FIG. 6 illustrates a top-side perspective view of the drink container from FIG. 1, depicting certain aspects, according to several embodiments. FIG. 7 illustrates a fixed, non-adjustable corner brace for the drink container from FIG. 1, according to an embodiment. It is known that $CO_2$ (carbon dioxide) and other gases, such as compressed air are typically stored/packaged in cartridges or canister cylinders or the like, so that gas is evenly distributed on the wall of packaging. This is why cylinder shapes of gas containers are typically used, to obtain and maintain equal wall PSI. Right angles in gas containers are typically avoided also because, for example, the gas can be trapped in right angle pockets. Round corners allow the gas to flow easily out of the container.

Thus, when the container 10 is intended to be used for example for carbonated drinks, it may be constructed with fixed or adjustable interior curved corners (see FIGS. 3-7) that are reinforced to hold for example up to 35 PSI. This creates a cylinder effect inside the container/box/keg 10. Thus, the container 10 may be constructed with right angles on the outside, which may be useful for stacking and transportation purposes for example, and round corners on the inside to accommodate the equal distribution of the gas inside. In other words, the inside of the box 10 may be cylinder (see FIG. 3) or oblong (see FIGS. 4-5) shaped, depending on the configuration of the outer skeleton of the container (square, rectangular, etc).

To reinforce the corners of the container 10 and to obtain the round corners desired, plastic 25 and/or corrugated cardboard 26, or a combination thereof, preferably biodegradable, may be used to fill the corners as shown in FIGS. 3-4 and/or to construct fixed or adjustable braces. The fixed or adjustable corner braces may have solid walls made from plastic and/or cardboard, sample structures of which are shown in FIG. 5 at 27 and in FIG. 7 at 27*a*.

A container may be made with all corners having fixed corner braces 27, 27*a*, fastened (e.g., by glue) to them, to obtain inside the cylinder or oblong shape needed to protect the right angle interior corners of the container from gas pressure. Thus, for example in FIG. 3, the exterior surface 23 of the container has a square shape while the interior surface 24 has a cylindrical shape.

Again, the corner braces may also be adjustable to accommodate various container sizes. To accomplish this, as shown for exemplification purposes in FIGS. 5-6, they may be constructed from a plurality of solid walls 29 made from plastic or cardboard that can slide with the aid of the sliding braces 28. The sliding braces 28 also keep the movable walls 29 in place after their sliding in or out. The adjustable corner braces offer the advantage of being capable of being used in different size boxes. Thus, a manufacturer would need only to manufacture a universal, one-size-fits-all adjustable corner brace. It should be observed also that container 10 having a rectangular (or square) shape on the outside and round corners on the inside has the advantage of having more interior volume than a container/box/keg that is round inside and outside (see FIG. 10). Thus, container 10 can carry more beverage than a container/box/keg that is round inside and outside. Further, the manufacturing costs are likely lower for container 10 than a container that is round inside and outside.

It should be noted that, when beverage or CO2, air, or gas is placed inside bladder 14, because of the interior box rounded corner construction, the plastic liner or bladder 14 takes the shape of a balloon which forms a cylinder like beverage packaging similar to a traditional steel keg, plastic soda or beverage bottle, glass bottle, can, etc. The unique rounded and reinforced corners of the container 10 prevent collapse of the container's walls and corners.

At 30 a beverage mixer and at 31 an opening for adding ingredients to the drink inside container are depicted. Both elements will be described in detail later in this disclosure.

Figure 9:
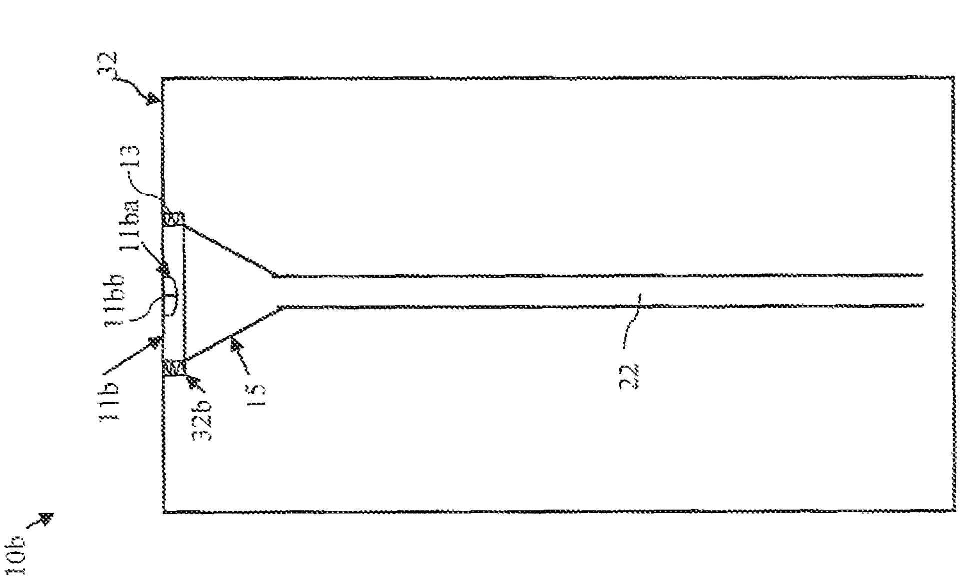
FIGS. 8-9 illustrate front sectional views of alternative embodiments of a drink container.
Figure 8:
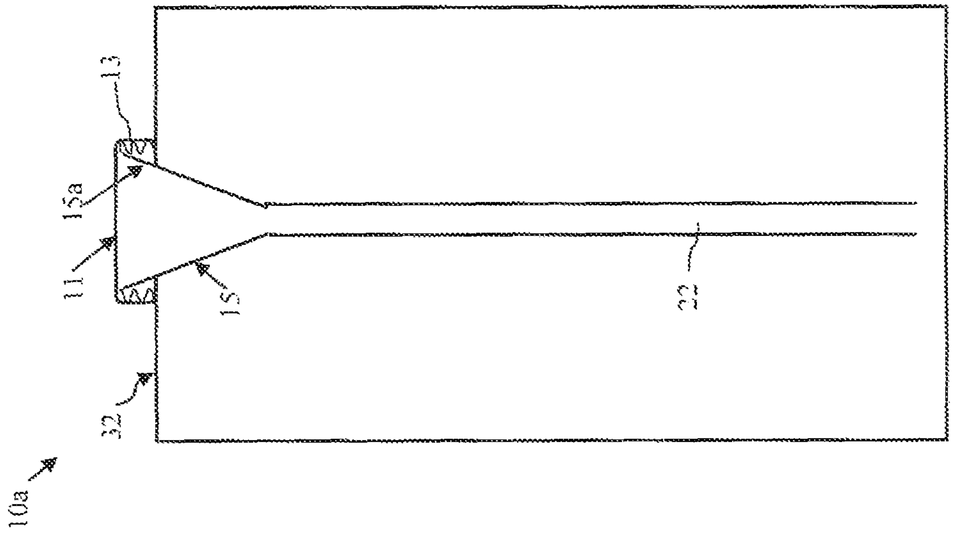

FIGS. 8-9 illustrate front sectional views of alternative embodiments of a drink container. The drink container 10*a* has the V-shape female coupling 15 extending out of the container, above the upper surface 32 of the container 10*a*. The thread element 13 for fastening cap 11 is provided as shown outside and around the portion 15*a* of the V-shape female coupling extending out of the container. This configuration may be advantageous for, for example, making it easier for the corresponding V-shape male coupling to slide into the V-shape female coupling 15, without the interference of spout 12 (FIG. 1).

The drink container 10*b* has a recess 32*b*, which has the thread element 13 on its vertical surface to enable the receipt and fastening of cap 11*b* for closing the container 10*b*. The cap 11*b* may have a concave portion 11*ba* divided by a separator 11*bb* to enable a user to screw/unscrew cap 11*b*. As shown, V-shape female coupling 15 extends upwards only to the bottom of recess 32*b*. This configuration may be advantageous for, for example, maximizing the space inside drink dispensers' chambers and for easy stacking of the containers during transportation or storage. This is facilitated by the fact that, as shown, the upper surface of cap 11*b* is even in this configuration with the upper surface 32 of the container.

It should be understood that the container alternative embodiments depicted in FIGS. 8-9 are shown as examples only. Various other similar alternatives may be adopted without departing from the scope of the invention. What is important is the V-shape (e.g., funnel shape) female coupling 15, which is configured to receive a corresponding V-shape male coupling 15*b* (see FIG. 16 for example) to quickly create a friction air tight seal under the influence of a weight load applied to the V-shape male coupling.

Figure 10:
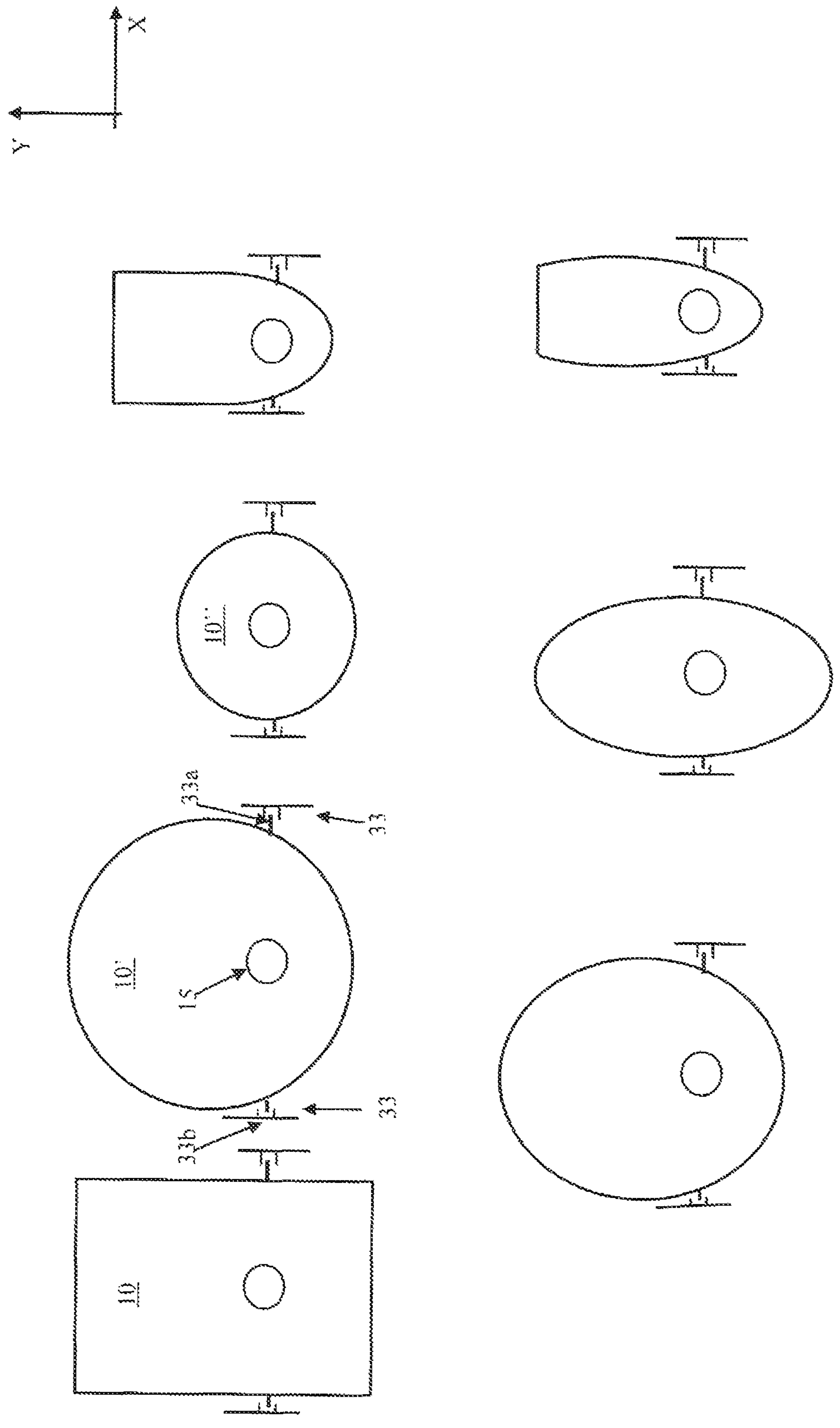
FIG. 10 illustrates top views of alternative embodiments of a drink container.

FIG. 10 illustrates top views of alternative embodiments of a drink container. As illustrated, the drink container may have various sizes and shapes, such as a rectangular (or square) box shape 10, a cylindrical shape 10' and 10" and other shapes as shown in FIG. 10 for exemplification purposes. A rectangular box may be adopted for example for a flat drink, while a container having round corners (e.g., a cylindrical container) may be adopted to carry carbonated drinks, to accommodate the pressurized gas inside as described earlier when referring to FIGS. 3-7. To accommodate for the variation in the drink container's sizes and shapes, while still ensuring proper alignment between the V-shape female coupling 15 of the container and the corresponding V-shape male coupling 15*b* (see FIG. 16 for example) of a drink dispenser, the container may be equipped with a guiding fin 33*a* to be received by a guiding slot 33*b* associated with the interior wall of the dispenser's chamber which receives the container (see 33 in FIG. 13). The guiding mechanism 33 including the guiding fin 33*a* and the guiding slot 33*b* ensures alignment of the V-shape couplings in a direction (Y), while the central location widthwise of the V-shape female coupling 15 in the container 10 ensures alignment in another, perpendicular direction (X). The combined effect is to ensure proper alignment between the female and male coupling.

Figure 11:
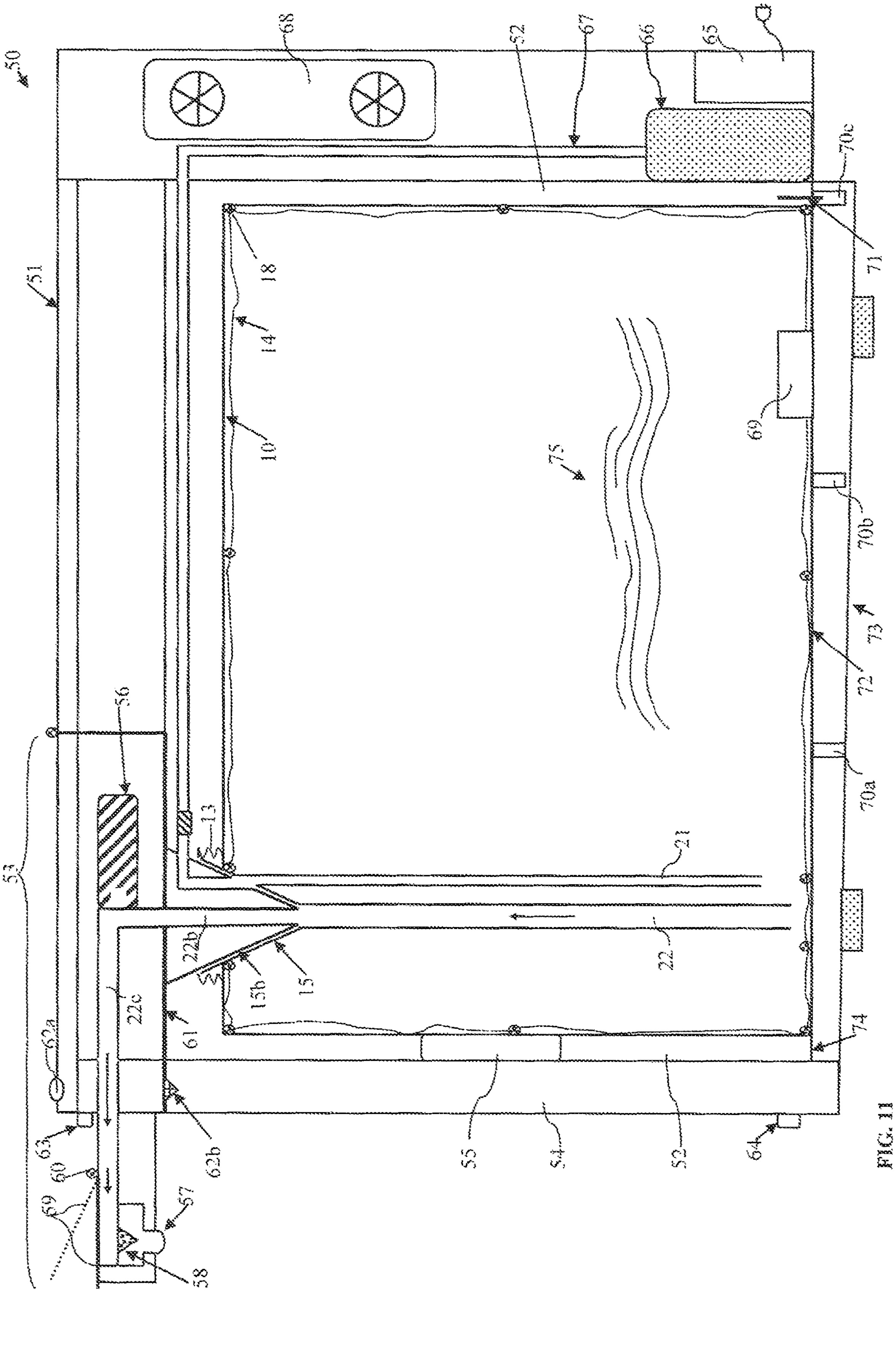
FIG. 11 illustrates a side sectional view of a countertop drink dispenser, according to several embodiments.
Figure 12:
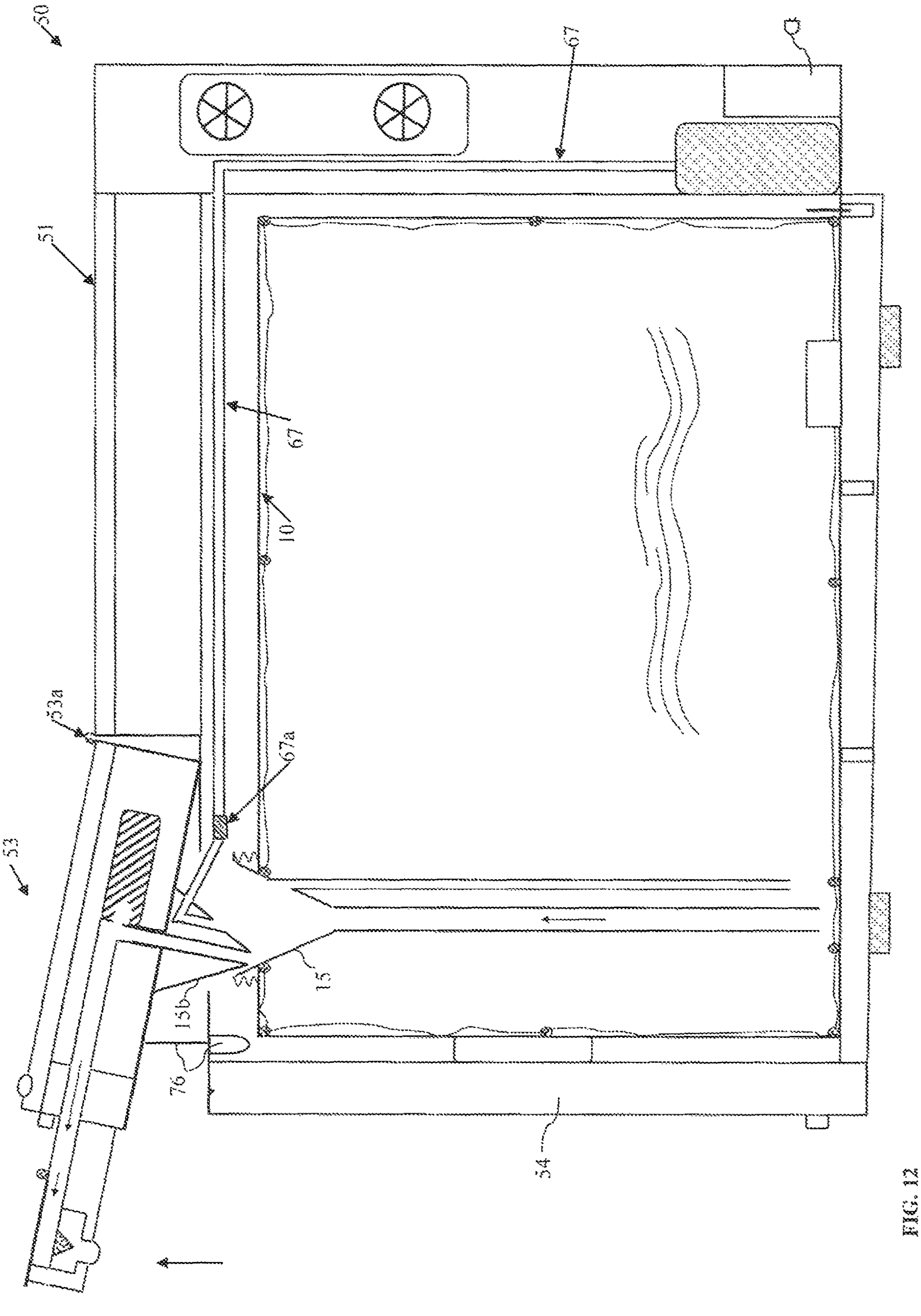
FIG. 12 illustrates the countertop drink dispenser from FIG. 11 in a different state.

FIG. 11 illustrates a side sectional view of a countertop drink dispenser, according to several embodiments. FIG. 12 illustrates the countertop drink dispenser from FIG. 11 in a different state. As shown, dispenser 50 may have a housing 51, a front door 54, a top lid housing 53 and a power source 65. Inside the housing 51, dispenser 50 may have one or more chambers 52 for receiving one or more containers 10 filled with liquid 75. It should be noted that front door 54 will have to be open and top lid housing 53 lifted up (see FIG. 12) high enough, such that the V-shape male coupling 15*b* escapes from the V-shape female coupling 15, in order for container 10 to be pushed in or pulled out of dispenser chamber 52 successfully.

After a container 10 is inserted in chamber 52, front door will need to be closed, such that for example a door fin 55 attached to the door can hold the front of container 10 in place. Several (one is shown only for drawing simplicity) adjustable lateral guide fins 69 (similar to those of a printer drawer for example) may be provided to ensure that irrespective of the width of the container 10, the V-shape female coupling 15 is aligned widthwise with the V-shape male coupling 15*b*, to make an air tight seal.

The guide fins are adjustable on the sides 69 as well as rear/back 71, to accommodate different sizes of beverage keg boxes or packaging and ensure that the V-shape female coupling 15 is aligned widthwise and lengthwise with the V-shape male coupling 15*b*, to make an air tight seal. Guide fins also allow cool air to flow easily around beverage box/keg 10 by holding box/keg 10 away from the walls of chamber 52.

The guide fins 69 may have a pin latch 69*a* (see FIG. 20) fitting in corresponding holes 69*b*, to allow guide fin adjustment to be locked in place. Similarly, for lengthwise alignment of the two couplings, guiding apertures 70*a*-70*c* (see FIG. 11) corresponding with for example the standardized lengths of container 10 may be provided, to receive guiding pin 71 behind the back of container 10.

It should be noted that a back to front downward slope (e.g., ¼ inches per each 12 inches) is provided for the floor 74 of chamber 52 (it should be observed that floor 74 sits higher in the back with respect to bottom 73 of dispenser 50; this ensures that when dispenser 50 sits on a horizontal surface the desired slope of floor 74 is obtained). This means that, when placed inside chamber 52, container 10 and its floor 72 will also be inclined downward from back to front. Thus, the liquid 75 will have the tendency to flow toward the well tube 22, thus aiding pump 56 to draw all or substantially all liquid 75 from container 10.

A separation between the V-shape female coupling 15 and the V-shape male coupling 15*b* may be observed in FIG. 11 and in other figures of this disclosure. It should be understood that the separation is depicted only to properly illustrate the individuality of the two V-shape couplings. However, in reality, when the top lid housing 53 is closed as seen in FIG. 11, there is no separation between the V-shape female coupling 15 and the V-shape male coupling 15*b*. They engage each other to create a friction seal. The force necessary to create the friction seal is preferably provided by the weight of the top lid housing 53 and of all the elements (e.g., pump 56) house into it. It should be understood that the coefficient of friction between the two couplings and the weight applied to the V-shape male coupling 15*b* by the top lid housing 53 and of all of its elements have to be coordinated with the pressure necessary to be maintained inside container 10. For example, for the same coefficient of friction (e.g., plastic on plastic), a greater weight will be needed for a greater pressure needed inside container 10 (e.g. for carbonated drinks).

The dispenser 50 may be equipped with a replaceable CO2 tank 65, which, as shown, may communicate through a CO2 duct 67 with the V-shape male coupling 15*b* and further with the CO2 line 21 of the container 10, when the V-shape male coupling 15*b* engages the V-shape female coupling 15 to create the friction seal described above. Thus, the friction seal between the two V-shape couplings also create a friction seal between the CO2 duct 67 and CO2 line 21. The CO2 may be used to carbonate the beverage 75 inside container 10.

The dispenser 50 may be also equipped with a refrigeration unit 68 (including a compressor, and evaporator and a condenser, similar to that of a refrigerator) for providing cool air inside chamber 52 for keeping the container 10 and the beverage in it 75 cool. For this purpose, a seal 61 (e.g., rubber seal) may be provided between the top lid housing 53 and the chamber 52, so that, upon closure of the top lid housing 53, the cool air does to escape from the chamber(s) 52. It should be understood that the entire chamber 52 will also have to be hermetically built and the door 54 hermetically closed to keep the cool air inside chamber(s) 52. The top lead housing 53 may be lockable with a latch 62*b*, which can be actuated (e.g., for release purposes) from a button 62*a*. Similar sealing and locking means (not shown) may be provided for the door 54.

The top lid housing 53 may have as shown the V-shape male coupling attached to it, so that the two lift and close together (see FIG. 12). When opening (lifting up) the top lid housing 53, again, the V-shape male coupling 15*b* escapes from the V-shape female coupling 15 of the container 10, so that for example an empty container may be removed by a user from chamber 52 and a new, full one inserted therein. This is a quick process by a user and thus an advantage of this coupling and dispensing system. A user does not need to go through the cumbersome and time consuming process of for example screwing couplings together.

The top lid housing 53 may be associated with the dispenser housing 51 through a hinge 53*a* (see FIG. 12), which may facilitate the opening and closing of the top lid housing 53. A lifting shock 76 may also be provided to aid the user in lifting the top lid housing 53. It should be noted that the CO2 duct 67 may need to be flexible enough, or a flexible joint 67*a* may need to be provided, such that to allow the lifting of the top lid housing 53.

Referring now to FIG. 11, as shown, the top lid housing 53 may house a pump 56, which can draw the liquid 75 from container 10 via well tube 22 and further through male coupling's pipe 22*b* and then push it toward drink dispensing/pour spout 57 via spout conduit 22*c*. It should be noted that the friction seal between the V-shape couplings 15, 15*b*, described earlier, also creates a seal between well tube 22 and pipe 22*b*.

Before reaching the pour spout 57, the liquid 75 (e.g., water) pumped out by pump 56 may be forced to pass through a beverage pod 58 (e.g., coffee or tea pod). This offers a myriad of possibilities to the user. Not only can a user make coffee and tea, but the user can customize any drink from the container 10 (e.g., lemon juice) with an aroma or flavor desired (e.g., strawberry) by inserting the appropriate flavor pod 58. A pod lid 59 associated with the top lid housing 53 through a hinge 60, so that it can be open (see dotted line) or closed, may be provided for facilitating the insertion and removal of the beverage/flavor pod 58. The pod lid 59 may have similar sealing and locking means (not shown to prevent drawing clutter) as those shown (61, 62*a*, 62*b*) and described earlier for the top lid housing 53.

The dispenser 50 may have also a power switch 64 and a control panel 63 to give the option to the user to make several selections (e.g., temperature selection, carbonated/non-carbonated drink, etc).

Figure 13:
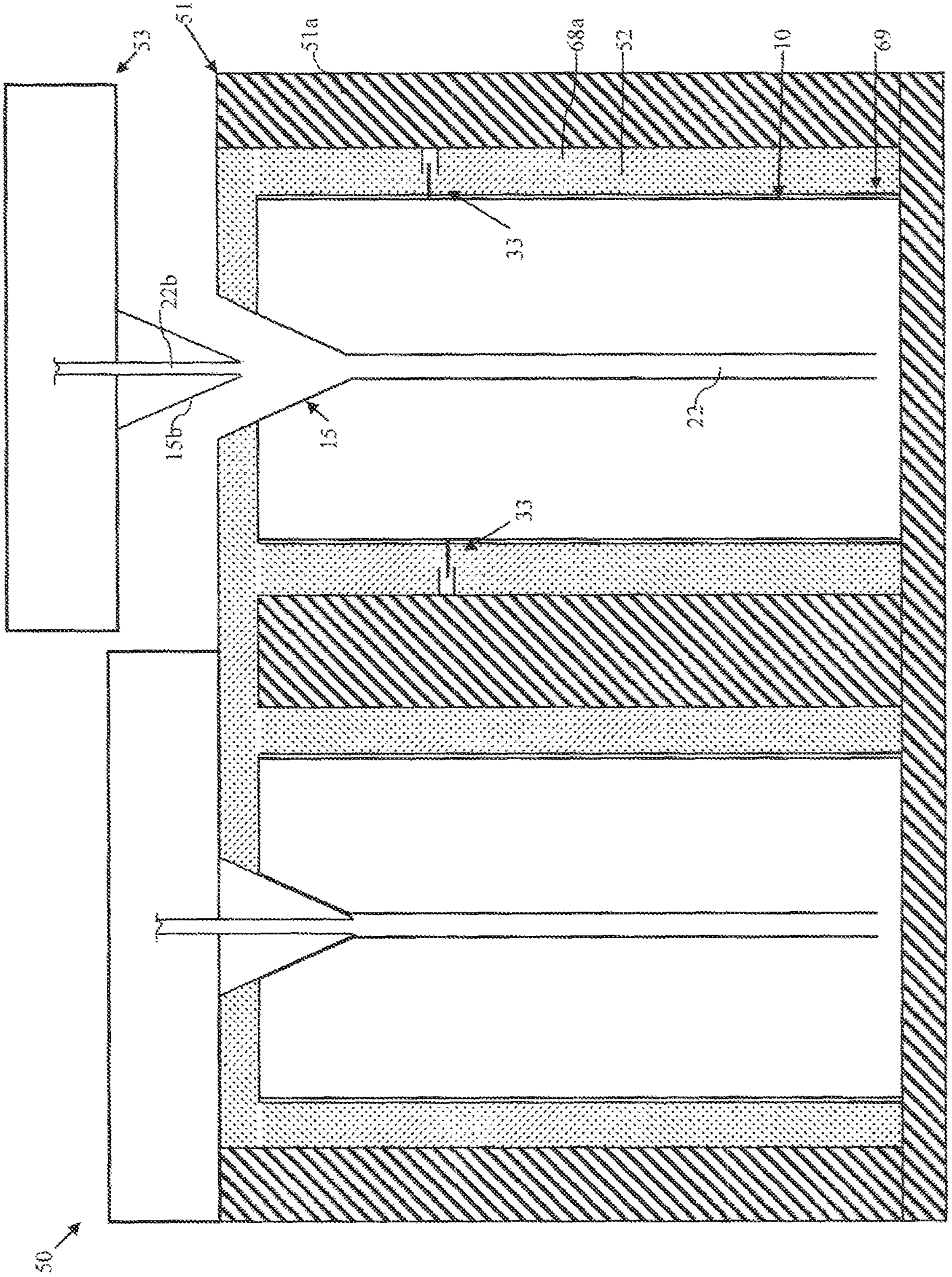
FIG. 13 illustrates a front sectional view of a drink dispenser having two chambers, according to an embodiment.

FIG. 13 illustrates a front sectional view of a drink dispenser having two chambers, according to an embodiment. A dispenser 50 may have one or more chambers 52. It should be apparent that a dispenser 50 that has more than one chamber 52 may receive a container 10 in each chamber and thus offer more options to a user. For example, a container may contain flat cold water, another may contain a carbonated drink, another may contain a juice, and so on. As stated earlier when referring to FIG. 11, one or more chambers 52 may be filled with cold air 68*a* provided by a refrigeration system 68 (FIG. 11) to keep the respective drink at a set temperature or at a temperature selected by a user. For energy saving purposes, the walls 51*a* of the dispenser housing 51 may be thermally insulated. And again, as shown in FIG. 13 and as stated earlier when referring to FIGS. 11-12, the top lid housing 53 has to be lifted high enough, such that the V-shape male coupling 15*b* retreats completely from the V-shape female coupling 15, in order for the container 10 to be removed from or inserted into chambers 52.

Figure 14:
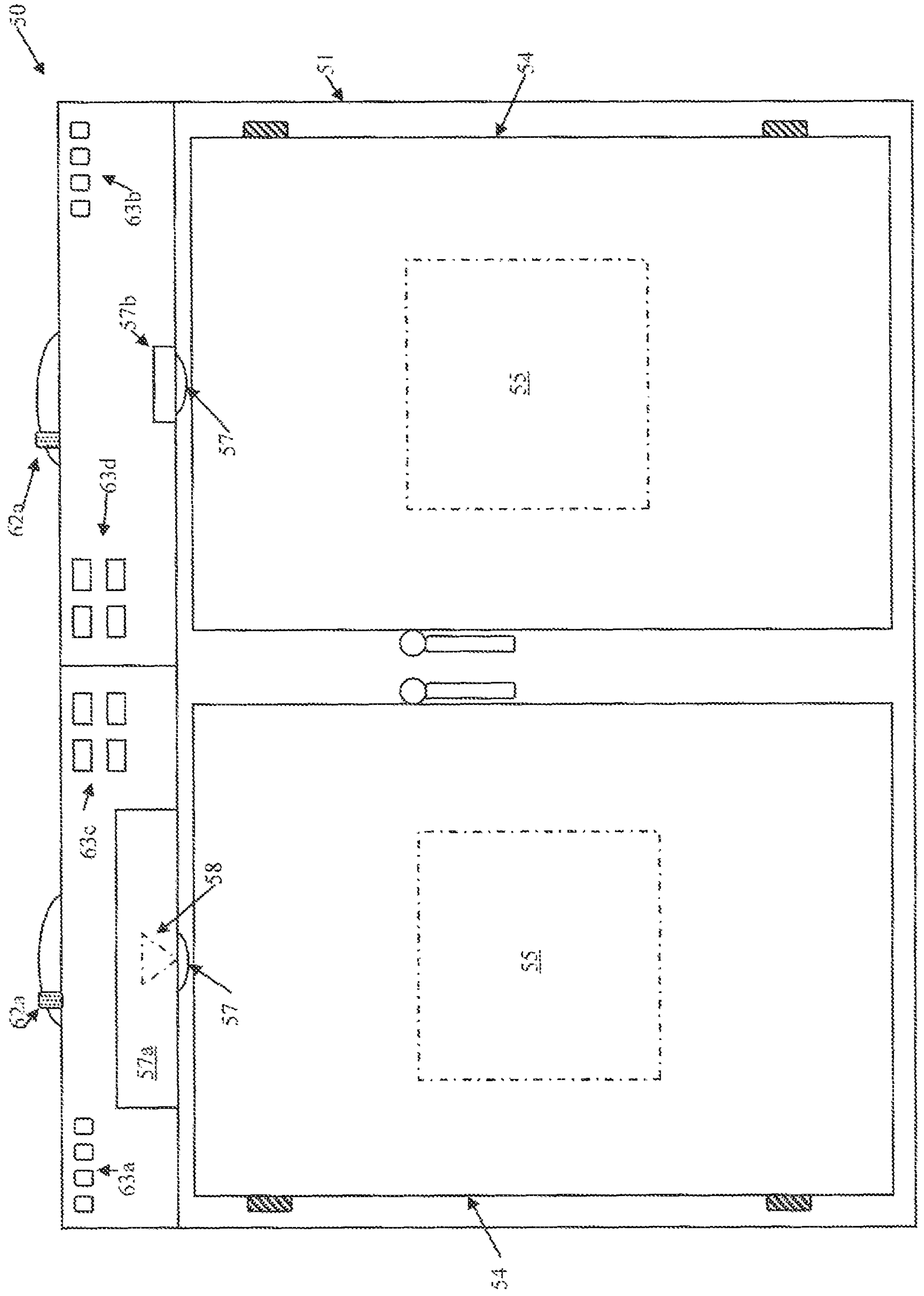
FIG. 14 illustrates a front view of a drink dispenser having two chambers, according to an embodiment.
Figure 15:
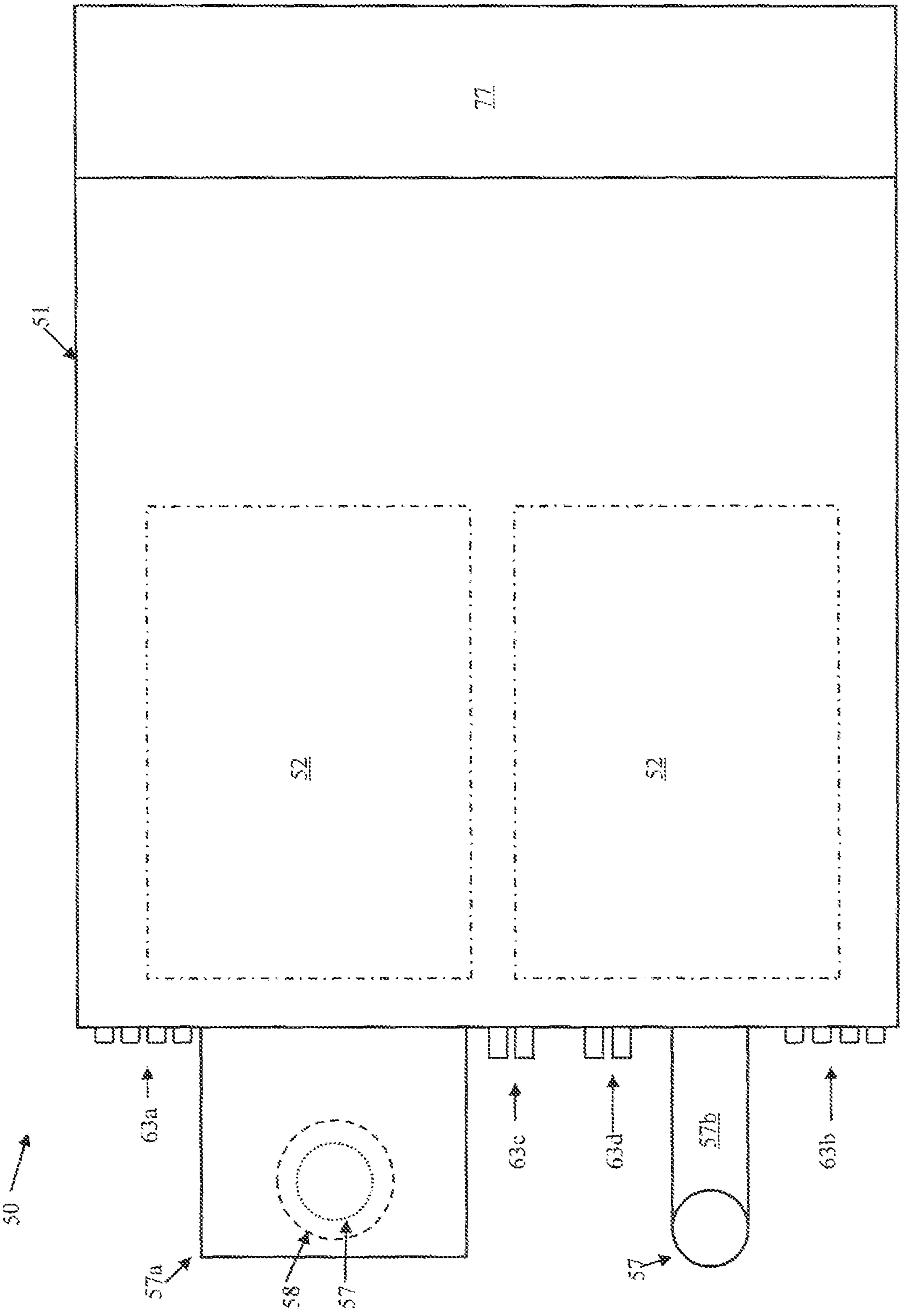
FIG. 15 illustrates a top view of a drink dispenser having two chambers, according to an embodiment.

FIG. 14 illustrates a front view of a drink dispenser having two chambers, according to an embodiment. FIG. 15 illustrates a top view of a drink dispenser having two chambers, according to an embodiment. It should be understood that a dispenser may have one chamber only, or it may have three, four (see FIG. 24 for example), six or more chambers. It should be noted that preferably each of the two chambers 52 has its door to allow for independent replacement of containers 10 (see FIG. 13). It should also be noted that, for example, one spout module 57*a* may be larger to accommodate the housing of the flavor/beverage pod 58 and other elements (e.g., heating elements; see 78 in FIG. 20), while the other may be smaller (57*b*). Through the spout 57 of the smaller spout module 57*b*, with no beverage/flavor pod, the user may get the unmodified drink (e.g., juice) from the respective container and chamber. It should be apparent that other combinations may be adopted, such as when both (or all if more than two), or none of the spouts modules are configured to accommodate the housing of a beverage or flavor pod 58, and/or heating. In addition, the spout module(s) 57*a* may be configured to also allow for the option of pouring the drink out of container 10 without adding flavor and/or heating and/or cooling.

Further, it should be noted that preferably each chamber 52 of dispenser 50 has its own flow controls, or other controls described herein 63*a-b*, for a user to select for example how much drink to pour, and/or temperature control and reader/display 63*c-d* to display for example the temperature in each chamber. Lastly, it should be noted that, as shown in FIG. 11, the refrigeration unit 68, CO2 tank 66 and power supply 65 are preferably located in the back portion 77 (FIG. 14) of housing 51.

Figure 17:
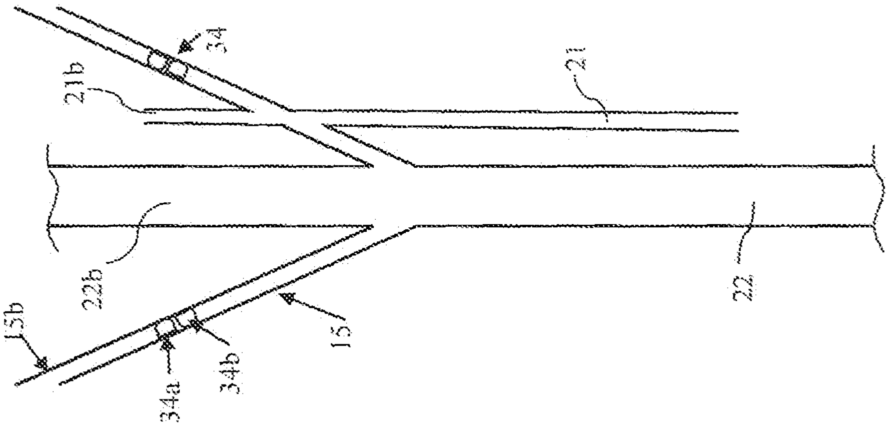
Figure 16:
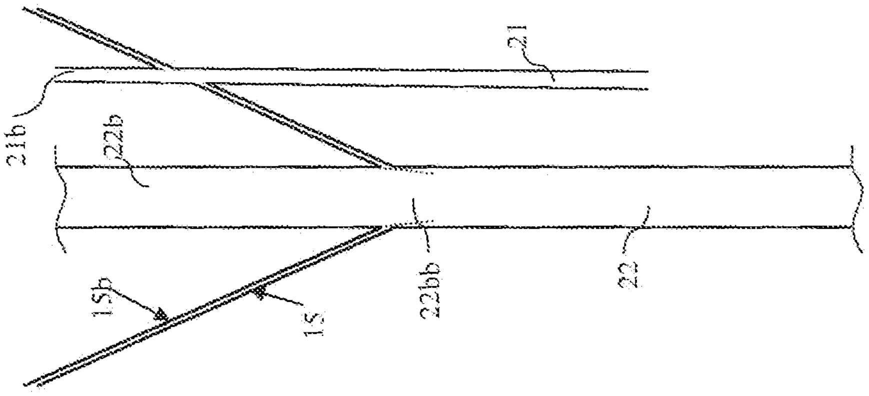

FIGS. 16-19 illustrate sectional views of male-female couplings, according to several embodiments. In FIG. 16 the V-shape female 15 and male 15*b* coupling is depicted as earlier described when referring to the precedent figures. In FIG. 17 an alternative embodiment is depicted in which a ridge system 34 may be employed to create the seal between the male and female coupling. A ridge 34*a* may be present all around the interior surface of the V-shape female coupling 15, and similarly, ridge 34*b* may be present all around the exterior surface of the V-shape male coupling 15*b*. When the V-shape male coupling 15*b* descends, as earlier described when referring to FIG. 11-12, into the V-shape female coupling 15, as shown, ridge 34*b* is preferably configured to pass ridge 34*a*, such that the two ridges sit next to each other, to create a seal. It should be noted also that the two ridges 34*a-b* are squeezed between the two couplings proportionally with the weight applied to the male coupling. This is because the V-shape (e.g., funnel) is narrower at the bottom. Thus, in this embodiment as well, the seal is stronger if more weight is applied to the male coupling 15*b*.

Figure 18:
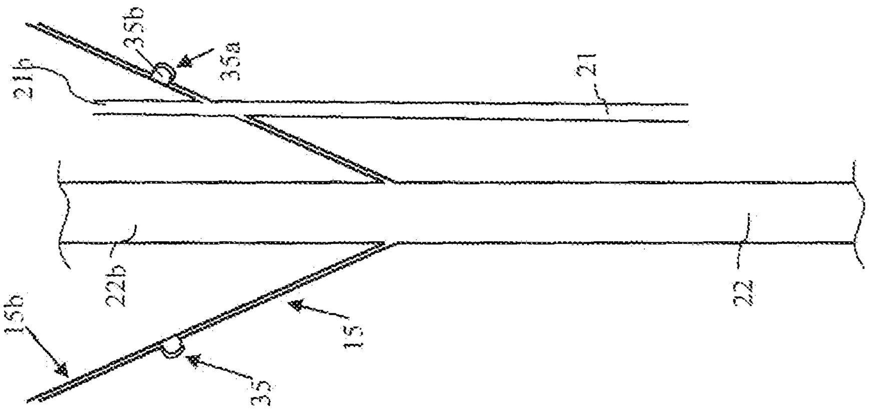

In FIG. 18, a channel 35*a* may be present all around the interior surface of the V-shape female coupling 15, and a ridge 35*b* may be present all around the exterior surface of the V-shape male coupling 15*b*. When the V-shape male coupling 15*b* descends, as earlier described when referring to FIG. 11-12, into the V-shape female coupling 15, as shown, channel 35*a* is preferably configured to receive ridge 35*b*, to lock the couplings and create a seal in addition to the seal between the interior surface of the V-shape female coupling 15 and the exterior surface of the V-shape male coupling 15*b*. This embodiment may be preferred when for example the strength of the seal between the two couplings has to be controlled. The locking aspect of the channel-ridge system 35 makes that possible.

Figure 19:
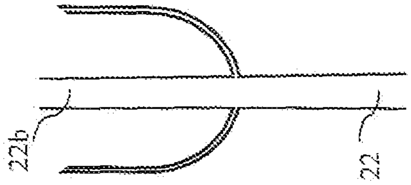
FIGS. 16-19 illustrate sectional views of male-female couplings, according to several embodiments.

FIG. 19 is offered as an example to illustrate that the male-female friction coupling described herein may have other shapes, besides the V-shapes (e.g., funnel shape). For example, the male-female friction couplings may have a U-shape or bullet shape as shown in FIG. 19. Other shapes may be adopted, such as cylindrical shape, prism shape, and so on. An advantage of the V-shape is that it also aids to guide and center the V-shape male coupling 15*b* as it enters the V-shape female coupling 15. Further, the V-shape coupling lends itself to a tighter seal. In addition, when, for example, the male coupling's pipe 22*b* has a beveled lower end or is extended with a beveled nose 22*bb* (see FIG. 16), it can slide inside well tube 22 creating an even tighter seal, and thus allowing better suction for the pump 56 (see FIG. 11).

Figure 20:
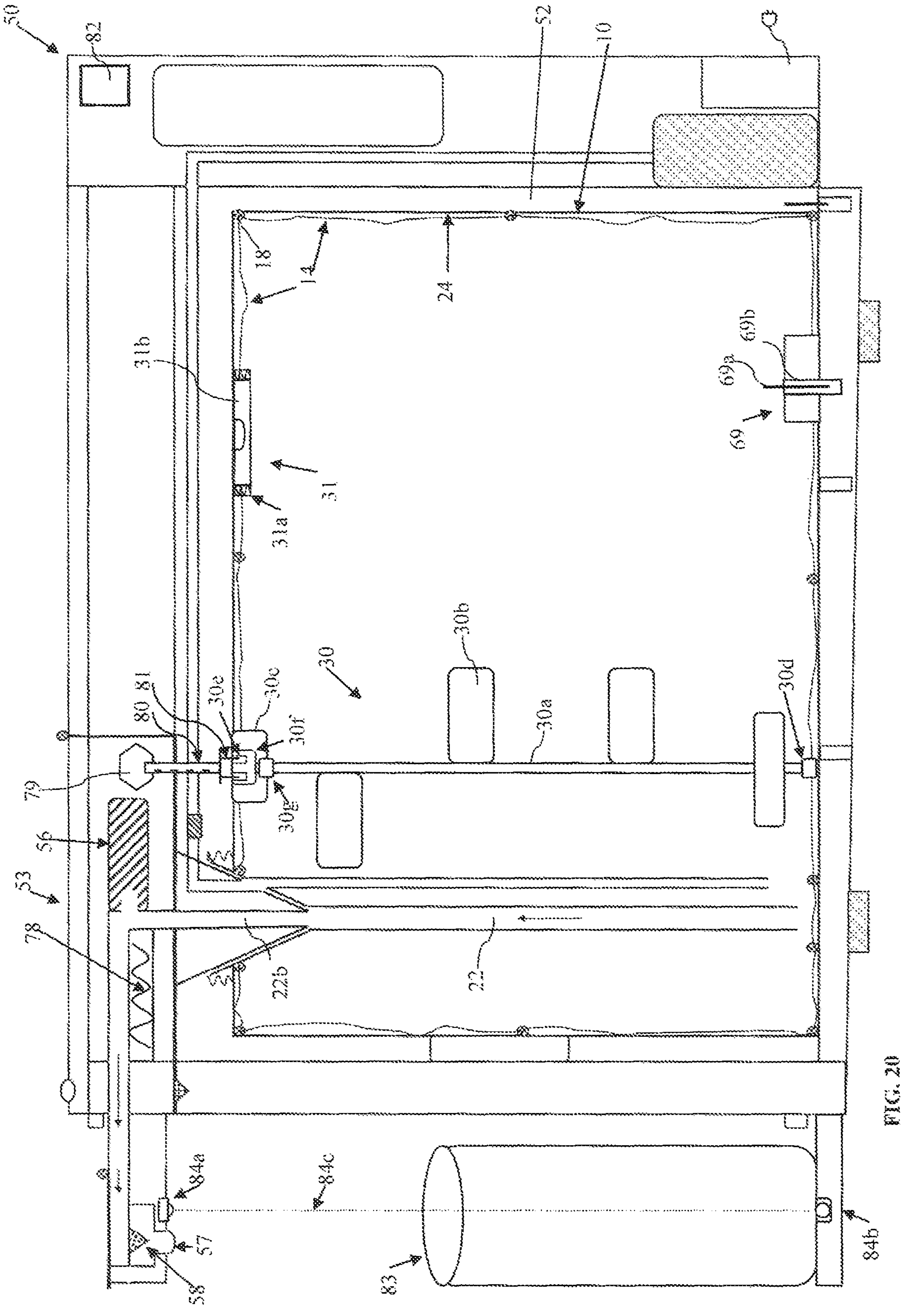
FIG. 20 illustrates a side sectional view of a dispenser system having a mixer and other features, according to several embodiments.

FIG. 20 illustrates a side sectional view of a dispenser system having a mixer and other features, according to several embodiments. As shown, a mix/stir motor 79 may be part of lift lid housing 53 and may be placed next to beverage pump 56 and behind the beverage heater 78. As it is the case with all the functions and elements of the dispenser 50 described herein, the mix/stir motor 79 may be controlled via dispenser controls (see for example 63*a* in FIG. 14) or a smart phone app communicating with a computer 82 of the dispenser 50. Upon its actuation, motor 79 spins a shaft 80. Associated with the shaft 80 two or more drive pins 81 may be provided. Thus, the motor 79, the shaft 80 and drive pins 81 will rise together with the top/lift lid housing 53 to allow the insertion of container 10 into chamber 52. Similarly, they will descend when the lift lid housing 53 will be lowered for closing (see FIGS. 11-12), such that the drive pins 81 can engage the corresponding apertures 30*e* of a top fin bar 30*f*, which can rotate inside a recess 30*c* at the top of container 10. It should be noted that other coupling means between drive shaft 80 and fin bar 30*f* may be used, such as friction/clutch means. The fin bar 30*f* may be attached to a mix/stir shaft 30*a* that goes down as shown into the container 10. The mix/stir shaft 30*a* may have several rotating paddle blades 30*b* to properly mix/stir beverages, cocktails or soft serve-food, ice cream, yogurt, soup, smoothie, juice, cocktails and so on. The rotation of the mix/stir shaft 30*a* may be eased by the use of bearings 30*d* and 30*g*. Bearing 30*d* will preferably be configured to provide also the sealing level corresponding to the pressure level desired to be maintained in the container 10 (i.e., higher pressure for carbonated drinks).

As shown, the container 10 may also be equipped with an ingredient access 31, which may be closed using an ingredient/screw cap 31*b* fastenable with the aid of, for example, threads 31*a*.

The screw cap 31*b* is preferably air tight preventing beverage from going flat or being spoiled. When screw cap 31*b* is opened, there is a possibility that a carbonated beverage could lose some of its carbonation. This is not a problem. As soon as top lid 53 and front doors 54 are closed, a CO2 sensor 86 (FIG. 22) may be provided to read the carbonation levels in the beverage container 10 an cause computer 82 to automatically add CO2 to container 10, via direction valve 85*a* (see FIG. 21), to re-carbonate to the proper level of carbonation for the beverage type in the respective container 10.

To create a mixed drink (e.g., cocktail, etc), a user may, before inserting container 10 into chamber 52, remove ingredient cap 31*b* from top of box/container 10, which allows user to add ingredients (e.g., juice, cut up fruit, etc) into the beverage (e.g., spirit, etc) present inside container 10. Next, the user would fasten ingredient cap 31*b*, thus closing ingredient access 31. Next, a user would insert container 10 into chamber 52, while lift lid housing 53 is lifted up (see FIG. 12).

Next, the user would close the lift lid housing 53, which will cause drive pins 81 to engage the apertures 30*e* of the top fin bar 30*f*. Next, the user would actuate the motor 80 via dispenser controls (see for example 63*a* in FIG. 14) or a smart phone app as described above. That would cause the stir shaft 30*a* and paddles 30*b* to spin and thus mix the added ingredient with the beverage inside container 10.

As shown in FIG. 20, the dispenser 50 may be equipped with cup controls sensors 84*a-b* that, via for example light beam 84*c*, can read if a beverage container/cup/glass 83 is in place for automatic pour when, for example, user sets dispenser 50 to pour at a certain time, in commercial use setting or home use. For example, the night before user goes to bed, user may set dispenser 50 via dispenser controls (see for example 63*a* in FIG. 14) or a smart phone app to pour coffee and/or chilled orange juice at 7:00 am. If the glass/container 83 is in place to receive the beverage, dispenser 50 will pour the beverage at 7:00 am. Further, computer 80 may be configured to notify user via your smartphone app or flashing light on control panel and/or audio signal that beverage is ready.

Figure 21:
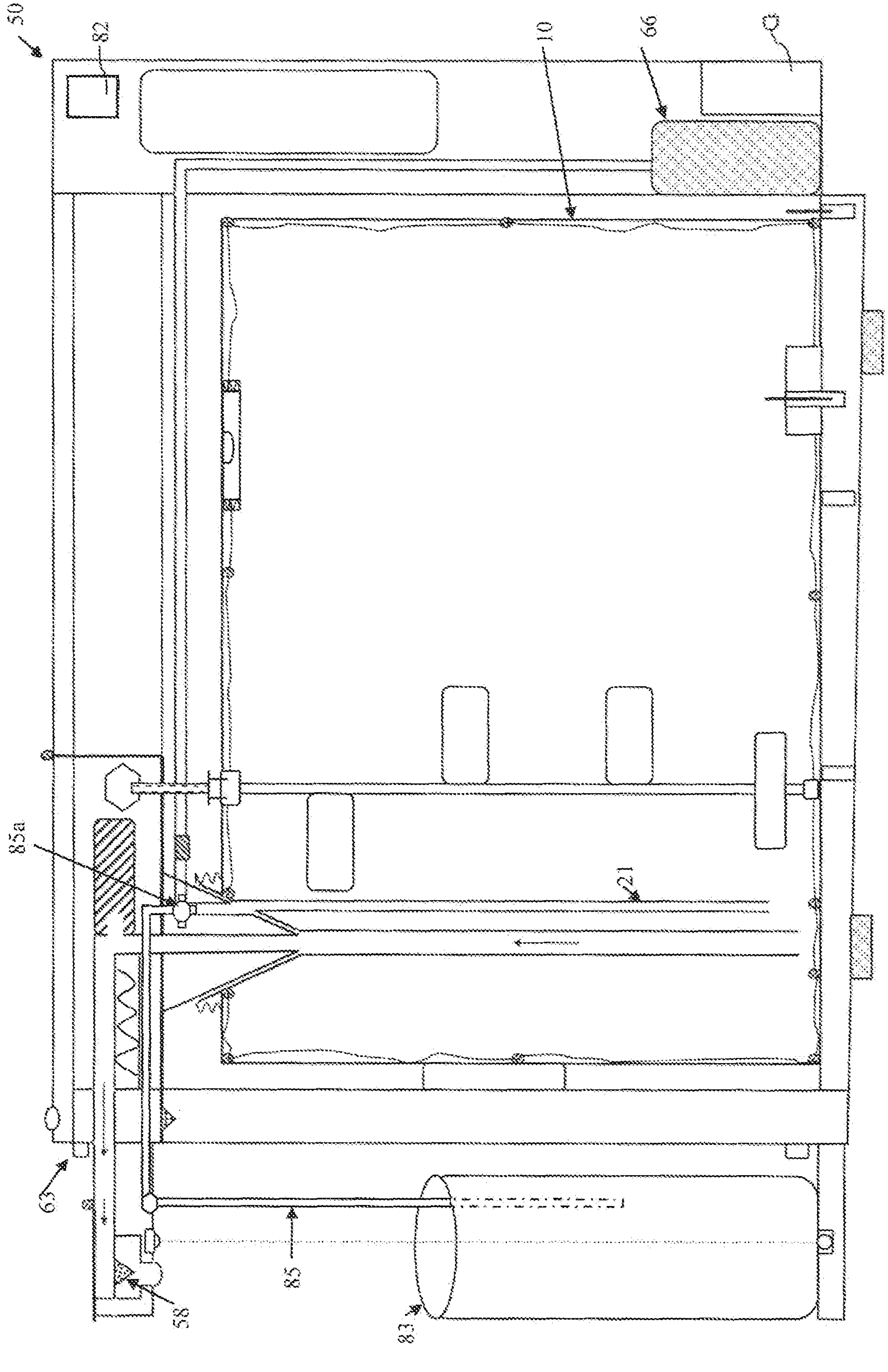
FIG. 21 illustrates a side sectional view of a countertop drink dispenser having a $CO_2$ line for the beverage glass, and other features, according to several embodiments.

FIG. 21 illustrates a side sectional view of a countertop drink dispenser having a $CO_2$ line for the beverage glass, and other features, according to several embodiments. As shown, the CO2 from the CO2 tank 66 may be passed through a direction valve 85*a* (e.g., a solenoid valve) electrically-actuable for example by computer 82 based on for example instructions received from a user via controls 63 or a scanner 90 of a bar code 89 on pod 58 (see FIG. 22). The direction valve 85*a* may send CO2 either to glass/cup 83 via cup CO2 line 85 or to container 10 via container CO2 line 21. This versatility of dispenser 50 is very important. For example, let's say that the container 10 is filled with spring (flat) water, to make coffee, tea or other non-carbonated drinks using drink/flavor pod 58. If now the user wants a glass 83 of carbonated water, user can for example press the appropriate control 63 to send CO2 just into the glass of water 83, leaving container 10 with non-carbonated water.

Figure 22:
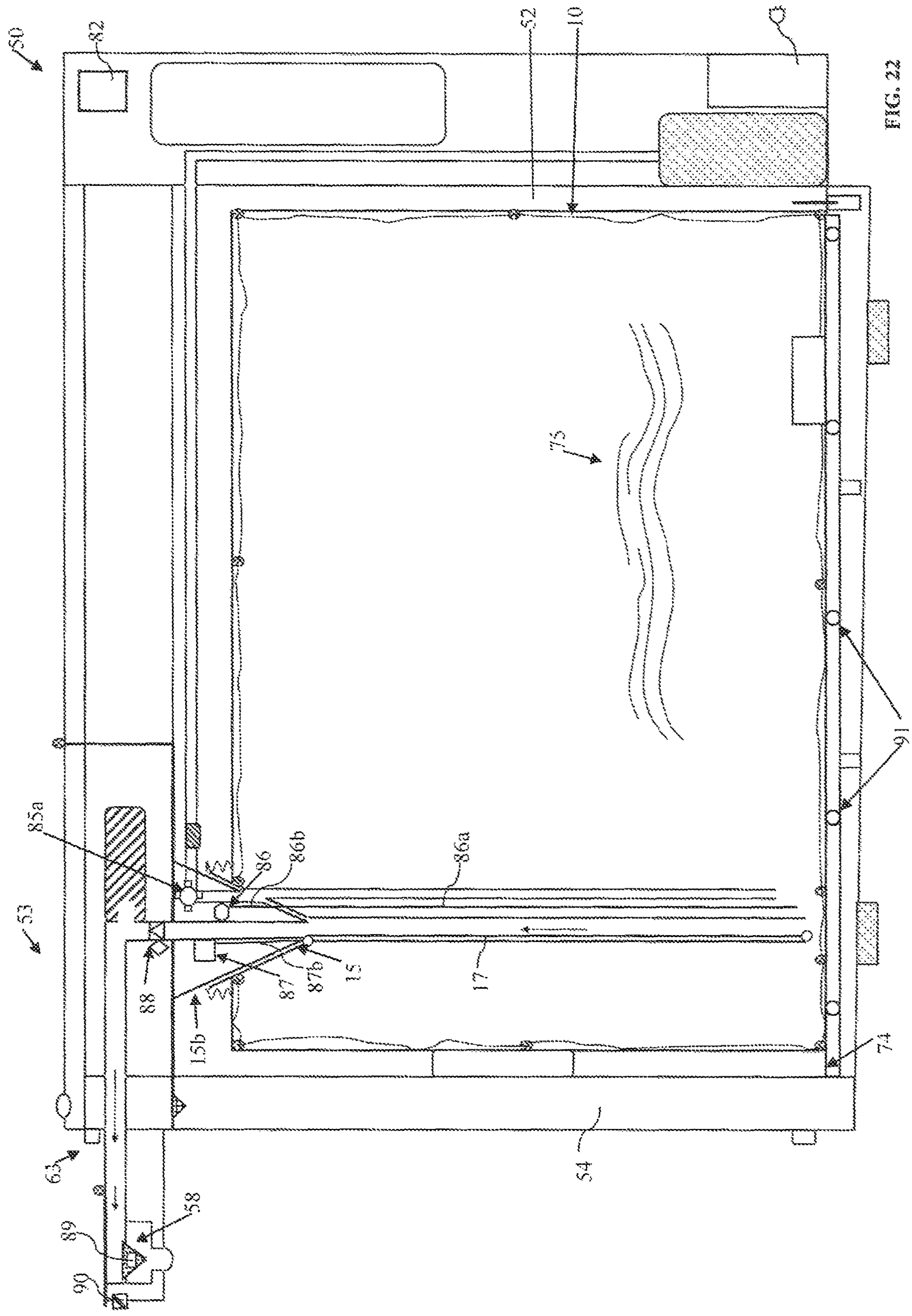
FIG. 22 illustrates a side sectional view of a countertop drink dispenser having a $CO_2$ sensor, and other features, according to several embodiments.

FIG. 22 illustrates a side sectional view of a countertop drink dispenser having a $CO_2$ sensor, and other features, according to several embodiments. Again, as mentioned earlier when referring to FIG. 20, a CO2 sensor 86 (FIG. 22) may be provided to read the carbonation levels in the beverage container 10 an cause computer 82 to automatically add CO2 to container 10, via direction valve 85*a* (see FIG. 21), to re-carbonate and maintain the proper level of carbonation for the beverage type in the respective container 10.

The CO2 sensor 86 may be connected to a male CO2 sensor strip 86*b*, which may reside as shown inside V-shape male coupling 15*b*. During the coupling of the female and male V-shape couplings 15, 15*b* as earlier described herein, the male CO2 sensor strip 86*b* is preferably configured to connect with a CO2 sensor strip 86*a*, with which container 10 may be equipped, if, for example, the beverage 75 inside container 10 is a carbonated beverage.

The dispenser 50 may have a smart beverage volume pour flow control valve 88 (e.g., a solenoid valve) controlled by computer 82, so that for example the user can set, from controls 63 or a smartphone app, the volume of beverage desired to be poured in user's cup 83 (FIG. 21). Dispenser 50 may also have a beverage volume level sensor 87 which may communicate with computer 82 to alert the user when for example beverage volume is low in container 10. The alert may be communicated to user via user's smart phone app and/or visual and/or audio alert signal on/from the front of control panel 63. The beverage volume sensor 88 may be connected to a male volume sensor strip 87*b* which may reside as shown inside V-shape male coupling 15*b*.

During the coupling of the female and male V-shape couplings as earlier described herein, the male volume sensor strip 87*b* is preferably configured to connect with the beverage level sensor strip 17 of container 10. Again, as stated earlier when referring to FIG. 1, the container 10 may be equipped with a beverage level sensor strip 17, which may assist a user as described above, in knowing the level of beverage remaining in the container 10 during use and/or alert the user to acquire a new/filled container.

As shown in FIG. 22, each beverage flavor pod 58 may have a scannable bar code 89. The dispenser 50 may have a bar code scanner 90 that can read the bar code 89 and then communicate the data to the computer 82. The bar code 89 may contain data regarding to, for example, what kind of beverage to pour: hot, cold, carbonated, non-carbonated, ounces of beverage, and so on. In addition, the bar code may contain data of interest to user, such as nutrition data, which computer 82 may communicate to user, for example, on a display (see for example 63*c-d*, FIG. 14) of the dispenser 50 and/or on user's smart phone.

Preferably, all bay chambers 52 have a floor 74 that can slide out on roller wheels 91 (FIG. 22), similarly to, for example, a kitchen cabinet drawer. This feature of dispenser 50 allows easier loading of beverage container 10 into chamber 52. For example, top lid 53 may not be able to open to a 90 degrees angle because of various restrictions, such as the upper kitchen cabinets, when dispenser 50 is used on a kitchen countertop. However, as described earlier, top lid 53 will lift/open enough to disconnect the male and female V-shape couplings, 15*b*, 15, allowing a beverage box 10 to slide into chamber 52 when front cabinet door 54 is open. However, for example, some beverage boxes 10 that are heavy or with for example irregular or odd shapes may need to be top loaded and adjusted into bay chamber guide fins 69, 71 (FIG. 11) to ensure proper alignment of the V-shape couplings 15, 15*b*. Therefore, preferably, all cabinet floors 74 slide outward of bay chambers 52.

Figure 23:
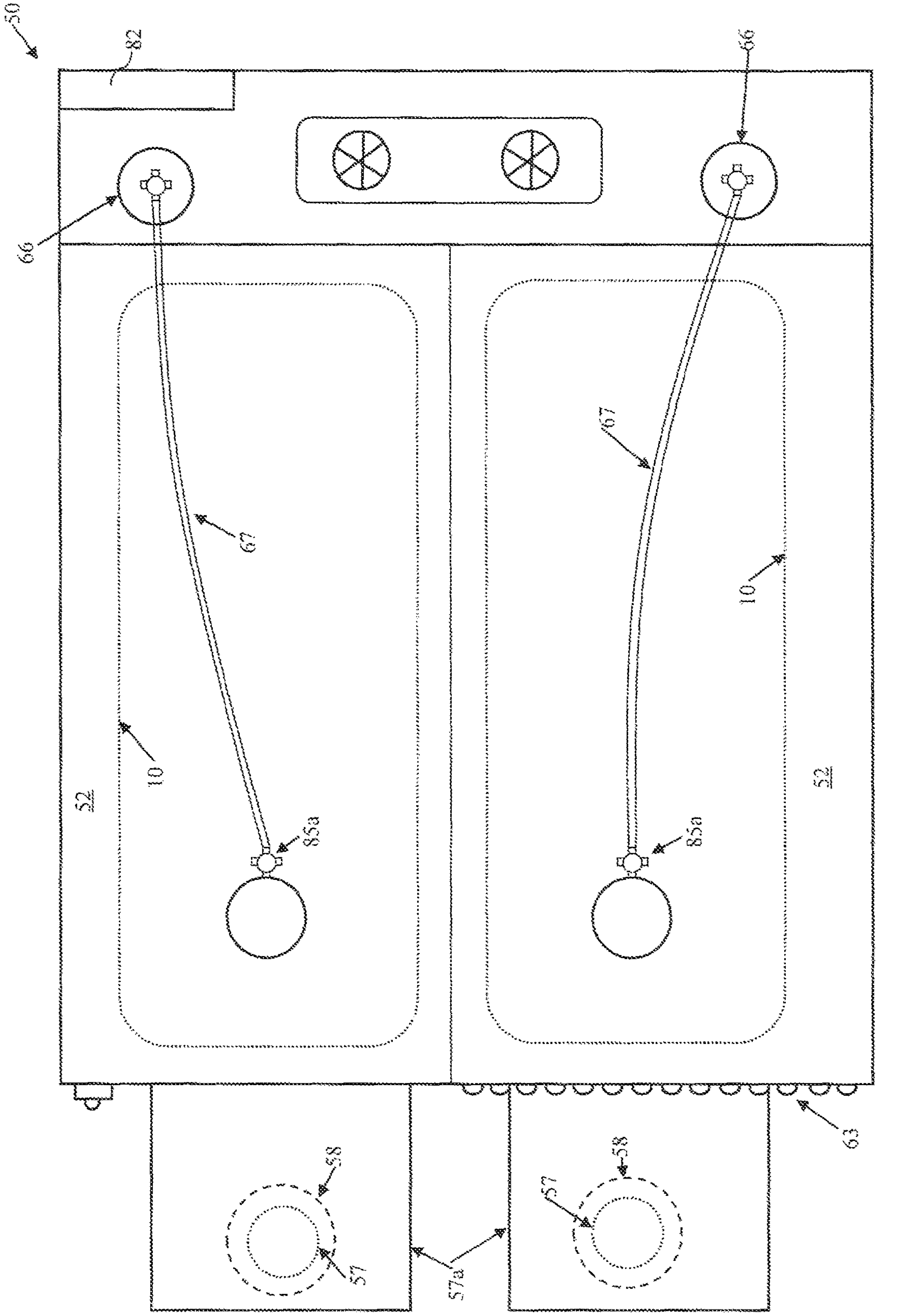
FIG. 23 illustrates a top view of a drink dispenser having two chambers, according to another embodiment.

FIG. 23 illustrates a top view of a drink dispenser having two chambers, according to another embodiment. As stated earlier in this disclosure, each dispenser 50 may have one, two or more chambers 52. In this embodiment two chambers are shown, each having an independent CO2 supply via CO2 lines 67 from CO2 tanks 66. As described earlier when referring to FIGS. 21-22, the CO2 supply is controlled via a directional/smart valve 85*a* by computer 82. In this embodiment, as shown, each spout housing 57*a* may accommodate a beverage pod 58. Thus, the dispenser 50 provides the versatility the user may need, such as pouring via each of the spouts 57 hot or cold, carbonated or non-carbonated beverage, which pouring user can control from control panel 63 or a smartphone app as described earlier.

Figure 24:
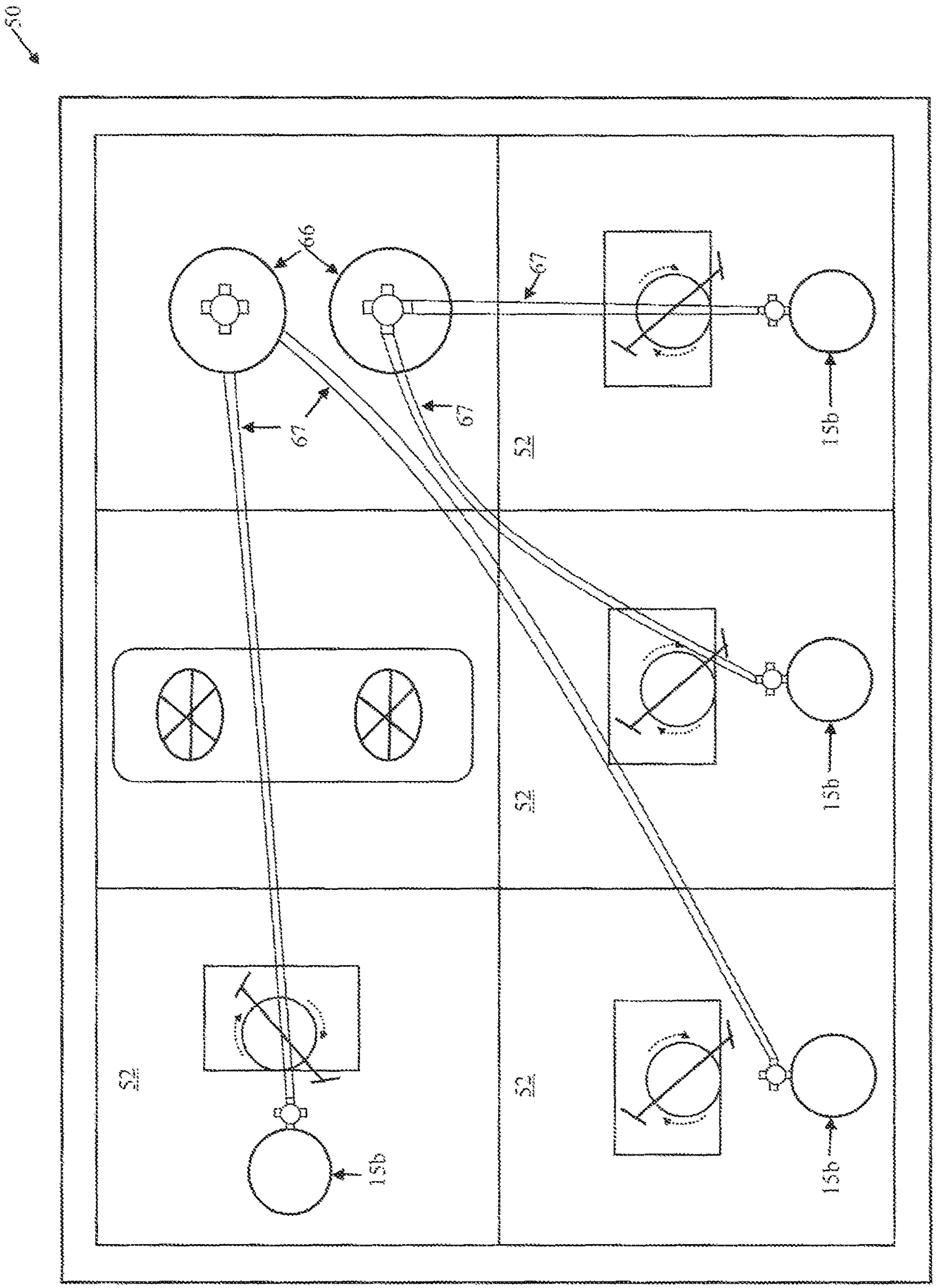
FIG. 24 illustrates a top sectional view of a drink dispenser having four chambers, according to an embodiment.

FIG. 24 illustrates a top sectional view of a drink dispenser having four chambers, according to an embodiment. This dispenser can be used as a larger floor model or corner top model. This is an example of a dispenser 50 having four chambers 52 and configured to fit a corner space, such that pouring can be done from two sides, left and front in this example. This two-side access may be advantageous in a commercial setting for example, when the dispenser may be a floor model accommodating larger containers/kegs.

Figure 25:
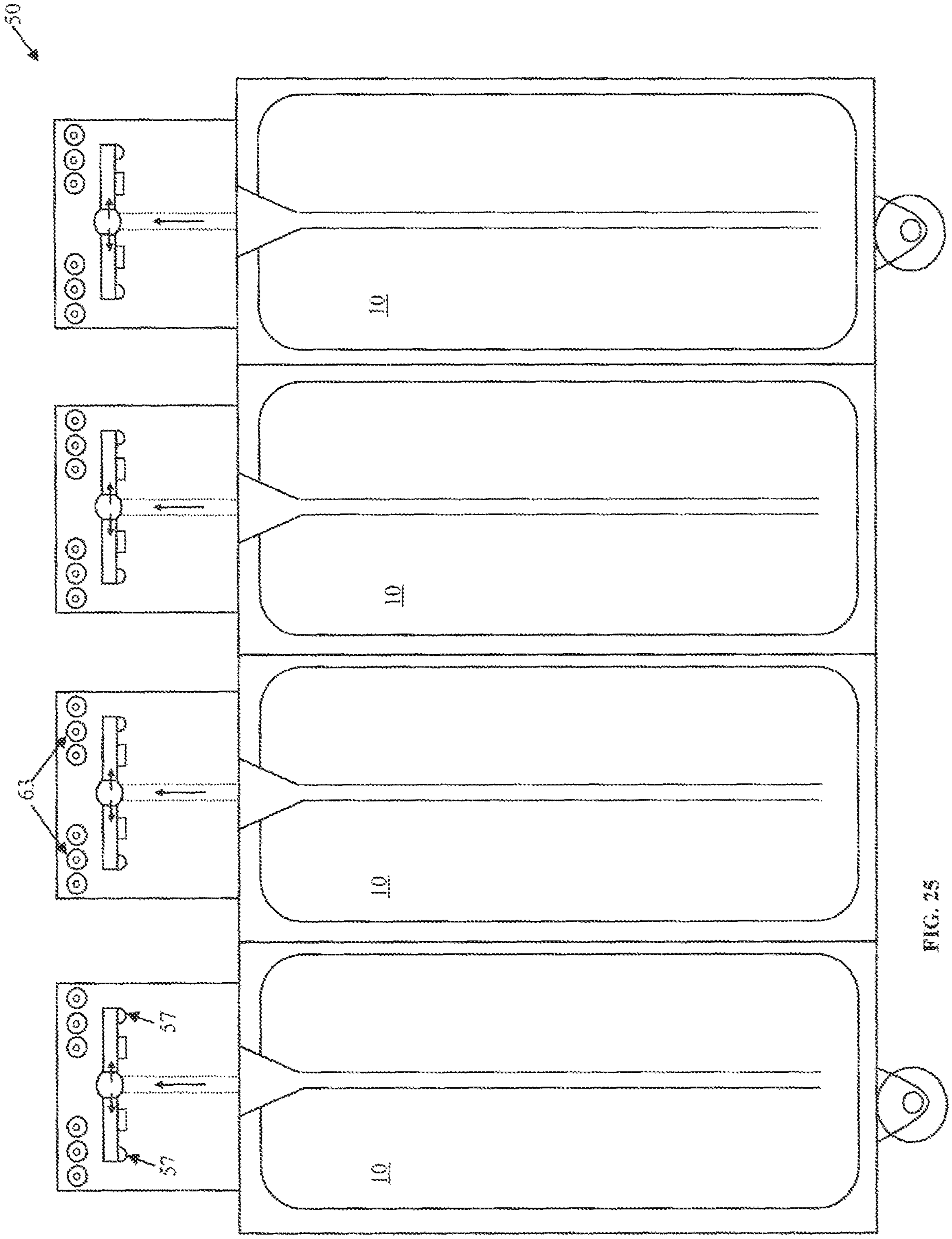
FIG. 25 illustrates a front sectional view of a drink dispenser having four chambers, according to an embodiment.

FIG. 25 illustrates a front sectional view of a drink dispenser having four chambers, according to an embodiment. What should be noted here that the dispenser 50 may be configured such that to provide the option of pouring at the same time via two spouts 57 from each beverage container 10. Thus, eight glasses could be filled at the same time. This arrangement may be advantageous in a commercial setting for example, when a bartender needs to serve several customers at the same time. This dispenser can also be used as a larger floor model or as corner top model too.

Figure 26:
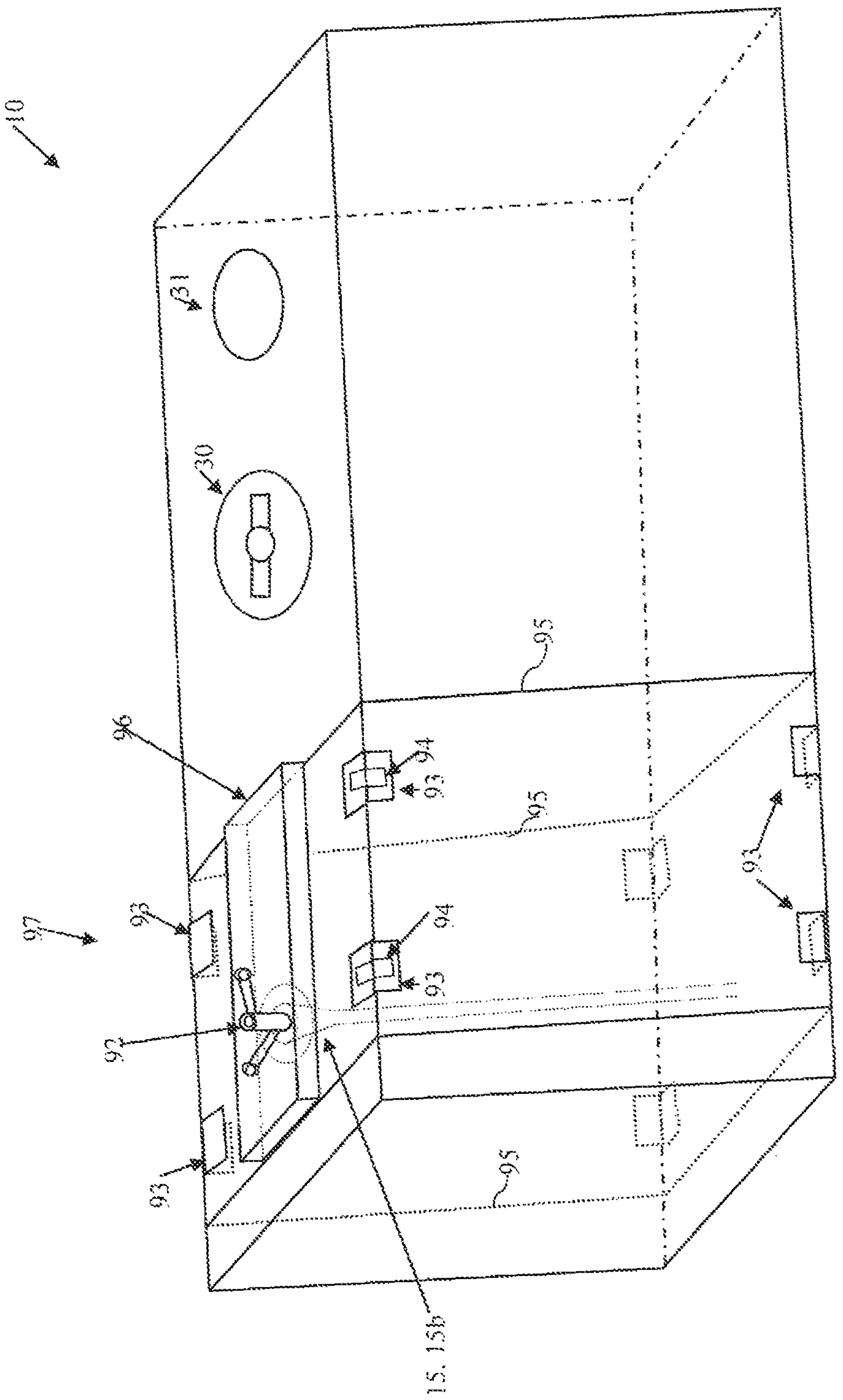
FIG. 26 illustrates the perspective view of a drink container equipped with a coupling adapter, according to an embodiment.

FIG. 26 illustrates the perspective view of a drink container equipped with a coupling adapter, according to an embodiment. 112. The cost of a commercial size container/keg 10 as described herein, versus the cost of traditional stainless steel kegs is significantly lower. This is because the container 10 is preferably made from biodegradable materials and as such is a one-way keg. There is no need to return the container/keg 10 to the drink manufacturer. Further, there is no need to or expense with washing the keg. The container 10 can simply and safely be discarded after use. Thus, besides making the container 10 work with the dispenser 50 disclosed herein, there may be a need to make container 10 having the V-shape female coupling 15 and all of its other elements disclosed herein work also with traditional keg system tri-clove fitting used in beer and wine industry today. This is simply because for example some user would not want to incur the expense associated with the replacement of their existing keg systems. For this purpose, a coupling adapter 97 may be provided, which can be configured to adapt to any existing keg systems, the uniqueness being the adapter's V-friction male coupling 15*b*, creating a friction seal with the V-friction female coupling 15 of container 10 as described earlier in this disclosure.

The coupling adapter 97, as shown in FIG. 26 may include a strap 95, made from stainless steel for example, and having hinges 93 on all four corners of container 10 and snap closed/open buckles 94 on one of the corners, to close/lock the strap 95. Preferably, eight hinges 93 total are provided. As shown, the coupling adapter 97 may include a traditional keg system coupling 92 (tri-clove) on top, so that existing line couplings can fasten into it. The traditional coupling 92 communicates preferably with a V-shape male coupling 15*b* placed underneath of strap 95 and secured by it after entering the V-shape female coupling 15 of container 10. A plate 96 may also be provided to provide depth and to reinforce the fastening of the traditional keg coupling 92 to the adapter strap 95. The corner hinges 93, snap closed/open buckles 94 and strap 95 create pressure on the underside V-shape male coupling 15*b* to create the friction seal with the V-shape female coupling 15 of the container 10.

Figure 28:
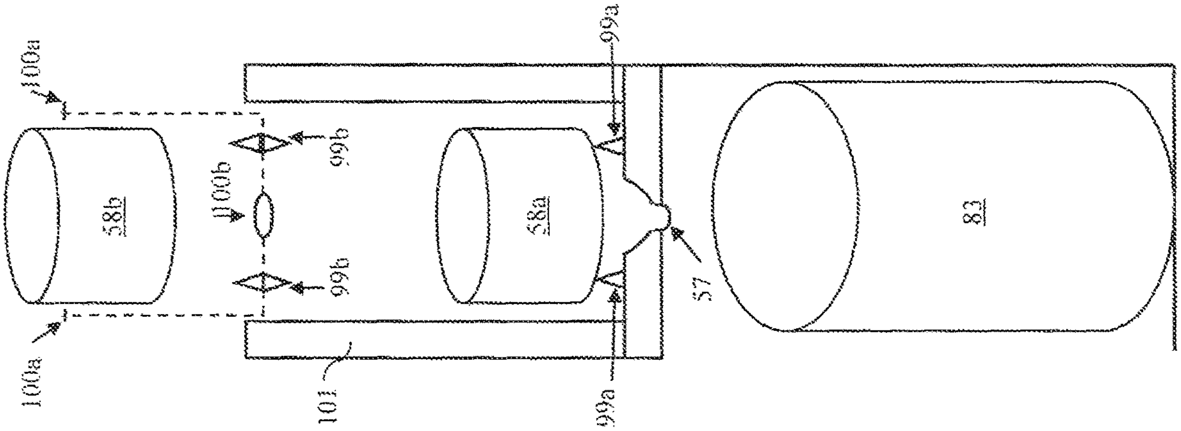
FIG. 28 illustrates the process of loading the spout housing from FIG. 27 with beverage pods, according to an embodiment.
Figure 27:
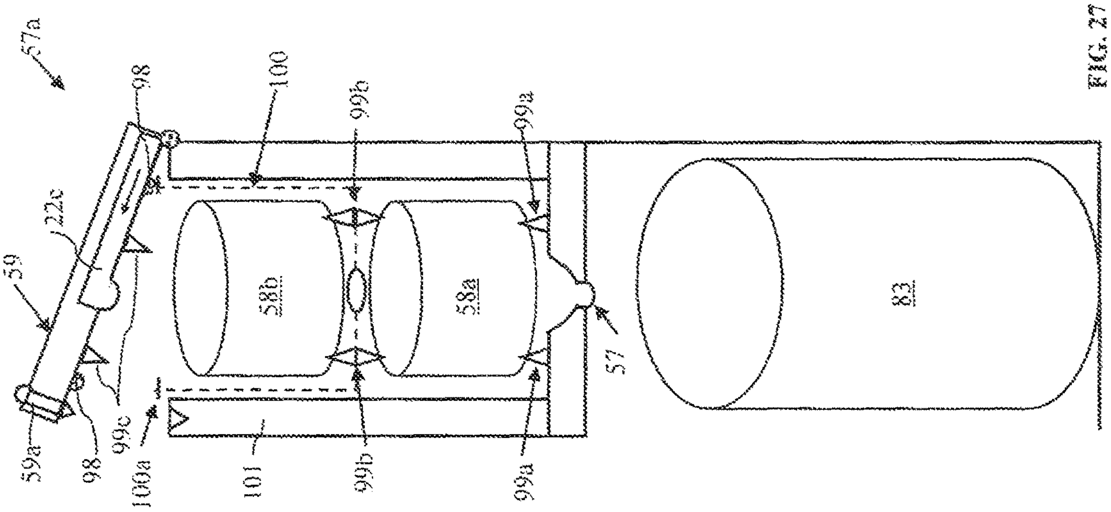
FIG. 27 illustrates the side sectional view of a spout housing of a drink dispenser, according to an embodiment.

FIG. 27 illustrates the side sectional view of a spout housing of a drink dispenser, according to an embodiment. FIG. 28 illustrates the process of loading the spout housing from FIG. 27 with beverage pods, according to an embodiment. So far in this disclosure, reference was made to a spout housing 57*a* of dispenser 50 accommodating one beverage or flavor pod 58 (see FIG. 15 for example). In FIGS. 27-28 it is illustrated that the spout housing 57*a* may be adapted to accommodate two beverage/flavor pods, 58*a*, 58*b*, preferably in a stacked arrangement as shown. Similarly, it should be understood that spout housing 57*a* may be adapted to accommodate three or more pods, stacked similarly as shown in FIGS. 27-28.

To accommodate two pods 58*a-b* in a stacking arrangement as shown, the spout housing 57*a* has to have the appropriate height. Further, the pod lid 59 preferably have two protrusions 98, such that, upon closure of pod lid 59, the two protrusions 98 push down onto the flange 100*a* located at the top of a preferably perforated basket 100. The pod lid 59 may be locked into the spout housing frame 101 via a latch 59*a*. At its bottom, the basket 100 preferably has two double spikes 99*b* that can pierce the upper pod 58*b* and the lower pod 58*a*. As shown the two double spikes 99*b* have an upper end extending into the basket 100 and a lower end extending away from the bottom of basket 100.

Thus, to use two pods, a user may first place the lower beverage/flavor pod 58*a* into the spout housing 57*a* and on top of lower spikes 99*a* located at the bottom of spout housing 57*a* and oriented upwards as shown. The sharpness of the lower spikes 99*a* may be such that to prevent the piercing of the bottom of lower pod 58*a* yet. Next, the user may place the upper beverage/flavor pod 58*b* into the basket 100. Next, the basket 100 with upper pod 58*b* may be lowered on top of lower pod 58*a*. The sharpness of the double spikes 99*b* may be such that to prevent the piercing of the top of lower pod 58*a* and bottom of upper pod 58*b* yet.

Next, user can push down to close and lock pod lid 59. This will cause upper spikes 99*c* attached to the pod lid 59 to pierce the top of upper pod 58*b* and upper portion of double spikes 99*b* to pierce the bottom of upper pod 58*b*. Further, this will cause the protrusions 98 to push onto flange 100*a* of basket 100, and thus, to push basket 100 downward, causing the lower portion of double spikes 99*b* to pierce the top of lower pod 58*a*, and, because the basket 100 will push the lower pod 58*a* downward, causing the lower spikes 99*a* to pierce the bottom of lower pod 58*a*. Thus, now the beverage from spout conduit 22*c* may flow through upper beverage/flavor pod 58*b* and then through lower beverage/flavor pod 58*a*, before reaching user's cup 83 via spout 57.

To facilitate the flow, basket 100 has preferably a square shape (in cross-section), while the pods are preferably of round shape. This would allow more space at the corners of the basket 100 for the beverage to flow. In addition, as shown, to also facilitate the flow, the basket wall and bottom may be perforated and the bottom of basket 100 may also have a flow opening 100*b*.

Now, because of the two-pod configuration, the user can add to the existing beverage (e.g., water, juice, beer, wine, spirit, etc) in the container 10 any two flavors or beverages users want (e.g., tea, coffee, soft drink (e.g., Pepsi™, Coke™), cherry flavor, etc) to create their own concoction.

It should be understood that when the spout housing 57*a* is configured to accommodate only one beverage/flavor pod 58*a*, the height of the spout housing 57*a* is smaller, such that the upper spikes 99*c* can reach the top of pod 58*a* upon closure of pod lid 59.

Figure 29:
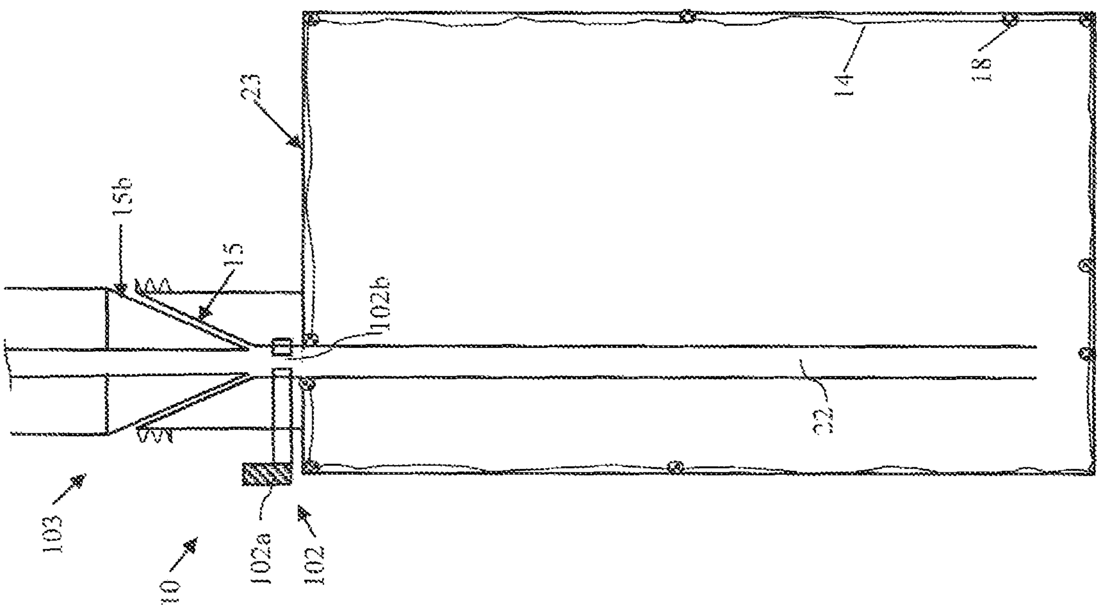
FIG. 29 illustrates a side sectional view of a drink container during filling at factory, according to an embodiment.

FIG. 29 illustrates a side sectional view of a drink container during filling at factory, according to an embodiment. It is well known that certain drinks such as wine are sensitive to air. For example, the taste of the drink may be negatively affected if air is allowed to mix with the drink. Further, air may contain chemical and/or biological elements that may contaminate the drink inside container 10. To prevent this, container 10 may be equipped with means that can be selectively engaged to prevent the air from entering container 10 and spoil the drink inside it. For example, container 10 may be equipped with a valve (e.g., a petcock valve) 102, which can close and open the well tube 22 of container 10.

As shown for exemplification purposes, if this approach is adopted, the well tube 22 may be extended above the upper surface 23 of container 10, to accommodate a placement of the valve 102 such that it can be easily accessed by a user for example. Thus, when container 10 is to be filled at the factory, lever 102*a* of valve 102 may be moved up for example, to open the valve 102, and thus well tube 22 (see valve opening 102*b* being aligned with well tube 22), such that liquid/beverage can be inserted in container 10 by factory equipment 103. It should be noted that preferably, in order to prevent air from entering container 10, valve 102 should be opened after the air tight friction seal is achieved between the V-shape female coupling 15 of container 10 and the V-shape male coupling 15*b* (similar to that of dispenser 50) with which the factory equipment 103 is preferably equipped.

It should be understood that valve 102, at the factory or when in the dispenser, may be opened or closed manually by a user, automatically through a mechanical leverage system (not shown), or, if the valve 102 is a solenoid valve, it could be actuated electrically (e.g., automatic command by computer 82).

It should be noted that all the other elements and functions of the container 10 disclosed herein remain otherwise the same if not conflicting with the modification(s) depicted in FIGS. 29-32 (raised well tube and coupling; valve on well tube). It should be further noted that all the elements and functions of dispenser 50 disclosed herein remain otherwise the same, with the exception of slight modifications that would be apparent to one of ordinary skills in the art, that may be needed to accommodate the raised well tube and valve and/or the presence of a valve.

Figure 30:
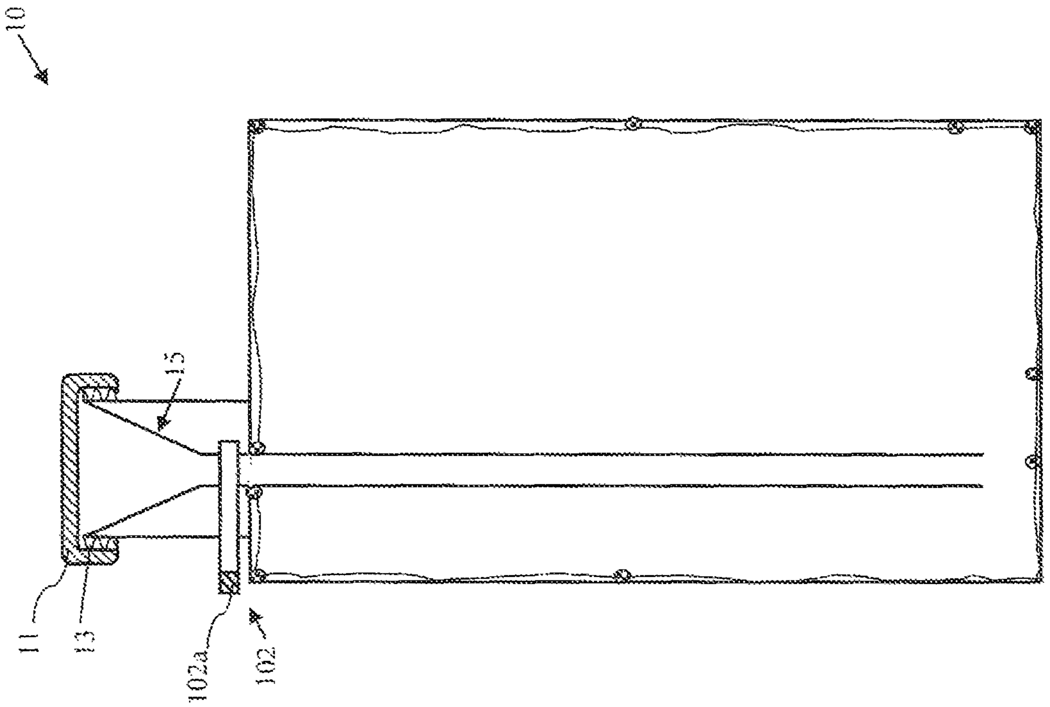
FIG. 30 illustrates a side sectional view of the drink container from FIG. 29 ready for shipping, according to an embodiment.

FIG. 30 illustrates a side sectional view of the drink container from FIG. 29 ready for storage and/or shipping, according to an embodiment. After container 10 is filled at the factory, valve 102 is preferably closed, by for example turning lever 102*a* down (see FIG. 30), such that to prevent air from entering via well tube 22 into container 10. Next, factory V-shape male coupling 15*b* is disconnected. Next, container 10 is preferably sealed with foil seal 19 (see FIGS. 1-2) and with cap 11, fastenable using threads 13 for example. The filled container 10 can now be shipped and/or stored.

Figure 31:
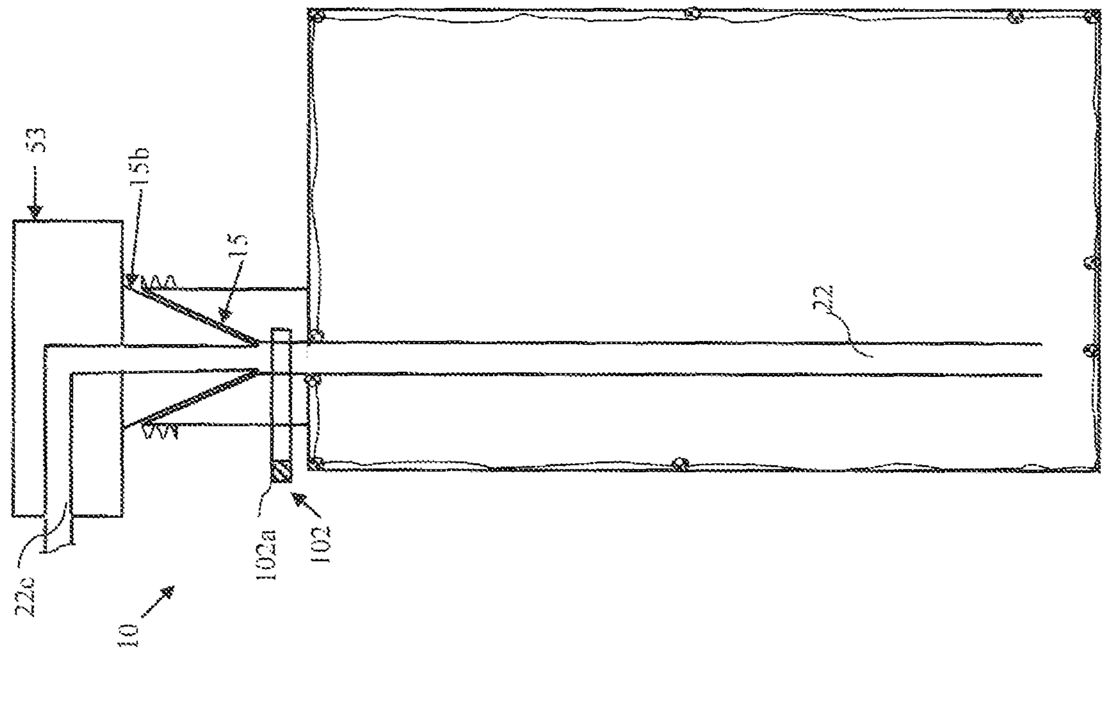
FIG. 31 illustrates a side sectional view of the drink container from FIG. 30 placed in a dispenser, according to an embodiment.

FIG. 31 illustrates a side sectional view of the drink container from FIG. 30 placed in a dispenser, according to an embodiment. When the filled container 10 arrives at the user, foil seal 19 (see FIGS. 1-2) and cap 11 may be removed and container 10 may be placed in the chamber 52 of a dispenser 50 as earlier described herein, while the valve 102 is still closed (see FIG. 31).

As described, the dispenser 50 (see FIG. 11 for example) preferably has a corresponding V-shape male coupling 15*b*, associated preferably with the top lid housing 53 of dispenser 50. After the airtight seal between the V-shape female coupling 15 and V-shape male coupling 15*b* is established as earlier described, valve 102 may be opened (see FIG. 32) by for example turning lever 102*a* upward as shown. The opening 102*b* of valve 102 is again aligned with the well tube 22 and thus pump 56 can draw the beverage from container 10 and pour it into user's glass 83 (see FIG. 20 for example).

Figure 32:
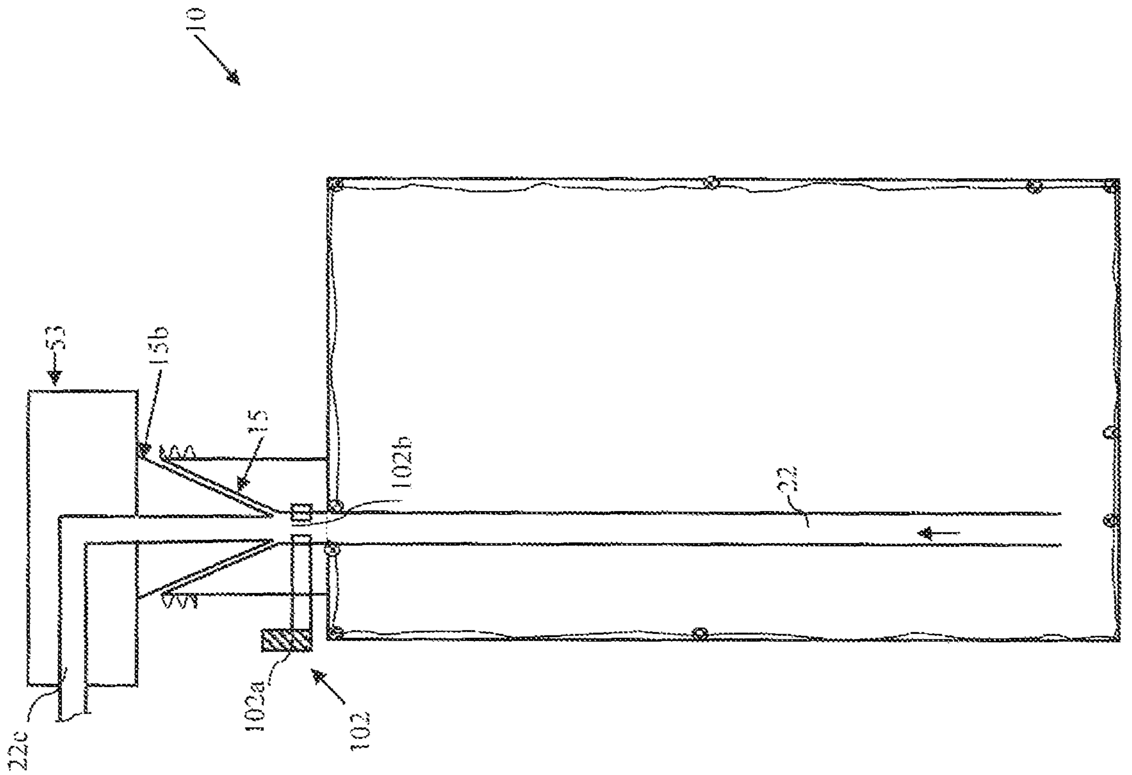
FIG. 32 illustrates a side sectional view of the drink container from FIG. 31 in a different state, according to an embodiment.

It should be noted that this is a complete closed loop process, from the beverage factory to user, preventing air from spoiling or contaminating the beverage inside container 10. Again, FIG. 32 illustrates a side sectional view of the drink container from FIG. 31 in a different state (i.e., valve 102 open), according to an embodiment.

Figure 33:
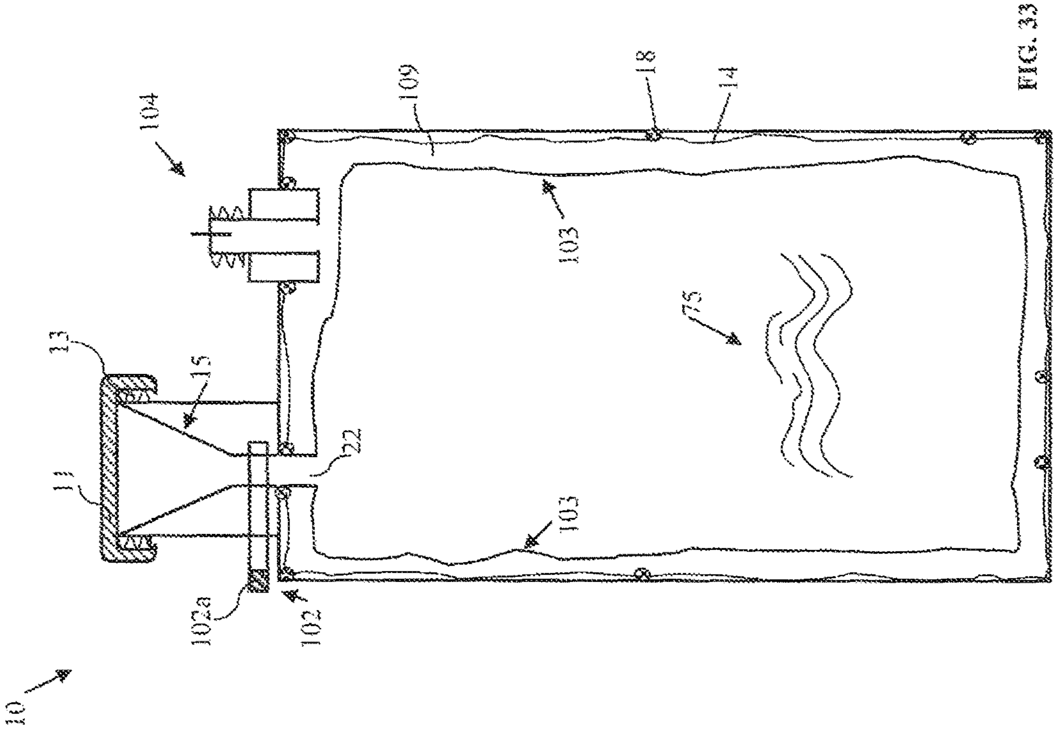
FIG. 33 illustrates a side sectional view of a drink container, ready for shipping or storage, according to another embodiment.

FIG. 33 illustrates a side sectional view of a drink container, ready for shipping or storage, according to another embodiment. As shown the drink container 10, may be adapted to be used for example for a picnic or a pool party, without the need of using a dispenser 50 described earlier in this disclosure. To that end, it should be noted that container 10 may have two bags inside, 14 and 103. Liner bag 14 was described earlier when referring for example to FIGS. 1-2. The inner bag 103 is sealed at the top as shown to a shortened well tube 22 and it is the bag that holds the beverage 75.

Container 10 may be equipped also with an air valve 104 (e.g., a typical bicycle air valve), which may be used to pump air in the space 109 between the liner bag 14 and inner bag 103, and thus force out the beverage 75 inside the inner bag 103. Any commonly available air pump (e.g., hand air pump, tire pump or compressor, etc) may be used to connect to air valve 104 and pump air in space 109. It should be understood that if container 10 is hermetically built, such as to prevent the escape of the air from its inside, liner bag 14 may be eliminated in this embodiment. It should be noted that well valve 102 is closed at this time, to prevent air from entering inside inner bag 103 and thus prevent spoilage or contamination of beverage 75, as earlier described when referring to FIG. 29-32.

Figure 34:
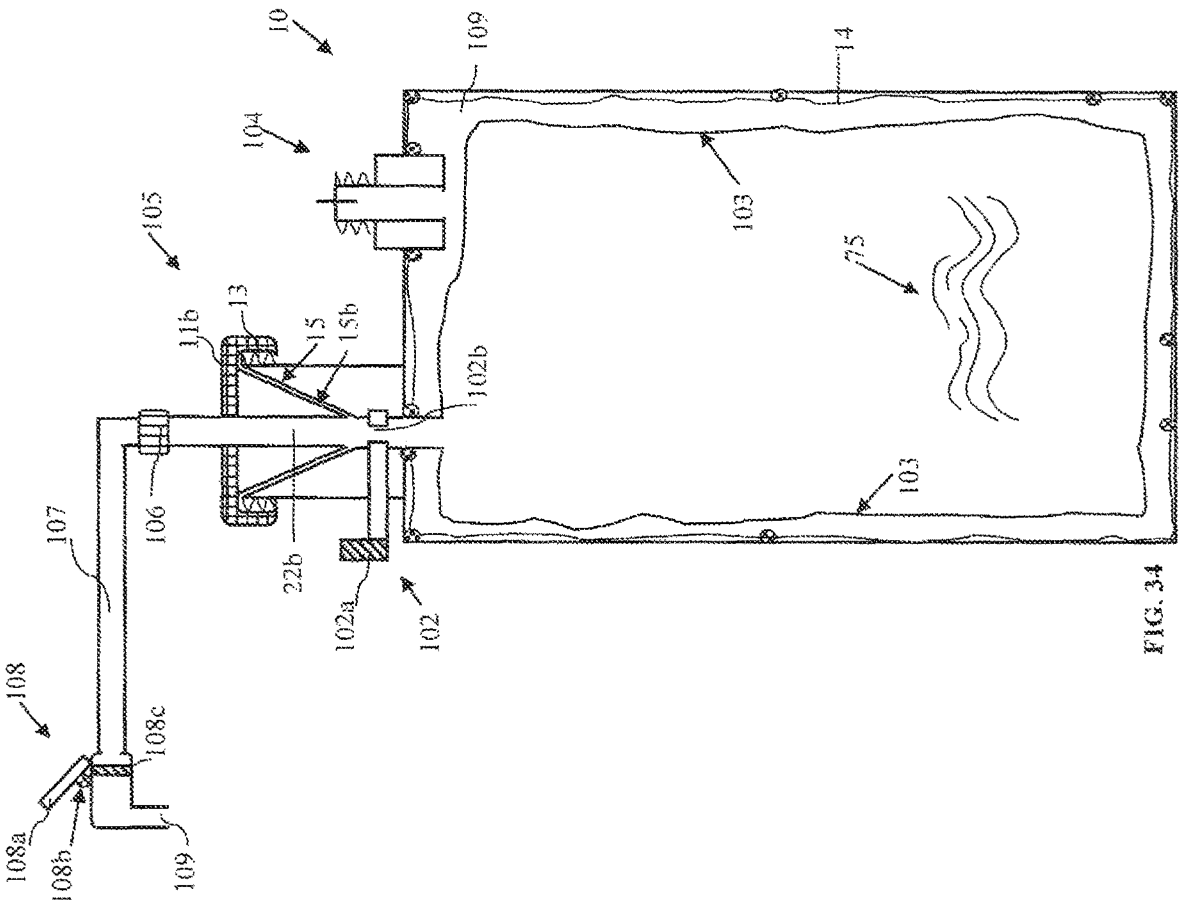
FIG. 34 illustrates a side sectional view of the drink container from FIG. 33, in use, according to an embodiment.

FIG. 34 illustrates a side sectional view of the drink container from FIG. 33, in use, according to an embodiment. Again, container 10 as described when referring to FIG. 33 is configured to be used without a dispenser 50. This may be very useful for example for limited budget parties, such as family picnics or pool parties, student parties, and so on. As shown in FIG. 34, when a user wishes to use container 10, user may first remove cap 11 (FIG. 33) and replace it with the picnic coupling 105. As shown, the picnic friction coupling 105 may include a male coupling's pipe 22*b*, a V-shape male coupling 15*b* and a picnic cap 11*b*.

The picnic friction coupling 105 may be fastened to the container 10 by simply screwing picnic cap 11*b* onto the threads 13. It should be noted that an air tight seal is created between V-shape male coupling 15*b* of the picnic coupling 105 and the V-shape female coupling 15 of the container 10, as earlier described in this disclosure. Next, the user may connect one end of a hose 107, using joint 106, to the upper end of male coupling's pipe 22*b*. The other end of hose 107, as shown, may have a beverage valve 108 associated with it. The beverage valve 108, may have a gate 108*c*, which may be lifted to allow beverage flow to picnic beverage spout 109, by pressing down a lever 108*a*, which is loaded with a spring 108*b*, to cause the lever 108*a* to return upon its release, and close the gate 108*c*.

Next, the user may open well valve 102, such that well valve opening 102*a* is aligned with the male coupling's pipe 22*b*. It should be noted that because of the previously established air tight seal between the V-shape couplings 15 and 15*b*, air will be prevented from entering inner bag 103 and beverage 75.

Next, the user may connect an air pump (not shown) to air valve 104, and use the pump to push air in the space 109, between the inner bag 103 and liner bag 14. The pumped air in the space 109 will press against inner beverage bag 103, propelling beverage 75 outward via male coupling's pipe 22*b* and hose 107. Beverage can now be poured via picnic spout 109 by simply pressing down lever 108*a* of beverage valve 108.

It should be understood that the order of the above steps is just an example. The user may for example pump the air inside container 10 at home, and then, when at the picnic site, open well valve 102 and pour the beverage by opening picnic valve 108.

It should be understood that picnic container 10 can be reusable, disposable and/or recyclable. Same may be true for the picnic friction coupling 105, hose 107 and/or picnic valve 108.

It should be noted that while this disclosure emphasized the use of the described systems and methods for dispensing drinks, similarly, they can be used for dispensing other liquids (e.g., liquid soap, soft serve foods, ice cream, yogurt, etc.).

The beverage container 10 disclosed herein can be made from cardboard, plastic, glass, metal or any combination of these or other suitable materials.

User may enter type of beverage and/or use by expiration date, via control panel or smart phone app, when installing new beverage box and packaging. Dispenser's computer 82 may then automatically calculate expiration date taking into account longer life of beverage because of airtight male and female V-friction coupling and/or not taking the beverage container in and out as it is the case when using a standard refrigerator. For example, open soda, wine, beer, will go flat after a short period when using a standard refrigerator. As another example, milk going in and out of refrigerator shortens beverage life. The airtight system and process disclosed herein extends the life of beverage.

It should be noted that the dispenser controls 63 of each chamber 52 or the smart phone app described earlier in this disclosure, which may be used for example to remotely set beverage pour, may be configured to control a variety of functions and display a variety of data, such as: beverage chamber temperature control setting (each chamber may be individually controlled for temperature); chamber temperature reading display; beverage selection (e.g., carbonated or non-carbonated; hot as in coffee or cold as in soda); beverage low volume alarm; beverage expiration date controls alarm; beverage container in place ready to pour (communicates to users that a mug, glass, cup, travel container or pitcher is in place to receive beverage; if no beverage container is in place dispenser will not dispense selected beverage); two station control valve and sensor for flow direction to pour spout (this multiple pour control allows one beverage keg box, packaging to supply beverage to move than one pour spout); auto select beverage, hot or cold (a hot beverage selection, causes pump to circulates beverage from chamber through element heating coils to heat beverage before entering cabinet housing where flavor pods are positioned, allowing flavored beverages, such as coffee, tea, hot cocoa, or even hot milk to be poured); CO2 PSI pressure control selector switch and gauge system showing PSI; child lock out control preventing children from pouring soda or energy drinks without parent permission; displaying what type of beverage is in which chamber after user enters beverage type (e.g., beer, lite beer, red wine, white wine, milk, soda, diet soda, water, coconut water, energy drink, orange juice, and so on); in a commercial setting, dispenser (see FIG. 25) may be set up to self-serve driver's license reading for age appropriate alcohol requirements (reader determines if self-serve customer is old enough to purchase alcohol; it can also accept self-serve customers credit card or beverage ticket for automated payment for beverage to relieve long beverage line at big event venues such as sporting events and concerts);

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

For means-plus-function limitations recited in the claims, the means are not intended to be limited to the means disclosed in this application for performing the recited function, but are intended to cover in scope any means, known now or later developed, for performing the recited function.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. An apparatus for dispensing a first liquid comprising a second liquid, the apparatus comprising: a male coupling configured to enter and establish a friction seal with a female coupling of a container containing the second liquid by inserting the male coupling into the female coupling and applying a load to the male coupling, the load being provided by the weight of a portion of the apparatus; a spout; and a pump for causing the second liquid to exit the container and the first liquid to be dispensed via the spout after the friction seal is established between the female and male couplings;

wherein the male coupling is V-shaped, and thus configured to enter and establish a friction seal with a V-shaped female coupling;

comprising a first carbon dioxide level sensor strip configured to connect with a second carbon dioxide level sensor strip of the container when the friction seal is established between the V-shaped female coupling of the container and the V-shaped male coupling of the apparatus.

* * * * *